United States Patent
Kusakabe et al.

[11] Patent Number: 6,058,477
[45] Date of Patent: May 2, 2000

[54] SYSTEM AND METHOD FOR AUTHENTICATION, AND DEVICE AND METHOD FOR AUTHENTICATION

[75] Inventors: Susumu Kusakabe, Kanagawa; Masayuki Takada; Yoshihito Ishibashi, both of Tokyo, all of Japan

[73] Assignee: Sony Corporation, Tokyo, Japan

[21] Appl. No.: 09/046,249

[22] Filed: Mar. 23, 1998

[30] Foreign Application Priority Data

Mar. 26, 1997 [JP] Japan ..................... 9-073205
Apr. 28, 1997 [JP] Japan ..................... 9-110889

[51] Int. Cl.[7] .................... H04L 9/32; H04L 9/14; H04L 9/16
[52] U.S. Cl. ................... 713/169; 713/170; 713/171; 380/283
[58] Field of Search ................... 713/201, 169, 713/170, 171; 380/21, 25, 283, 284; 709/227, 229

[56] References Cited

U.S. PATENT DOCUMENTS

| | | | |
|---|---|---|---|
| 4,803,725 | 2/1989 | Horne et al. | 380/44 |
| 5,371,794 | 12/1994 | Diffie et al. | 380/21 |
| 5,455,862 | 10/1995 | Hoskinson | 380/21 |
| 5,613,214 | 3/1997 | Shirasawa et al. | 455/54.1 |
| 5,784,464 | 7/1998 | Akiyama et al. | 380/25 |
| 5,812,666 | 9/1998 | Baker et al. | 380/21 |
| 5,933,501 | 8/1999 | Leppek | 380/21 |

FOREIGN PATENT DOCUMENTS

| | | | |
|---|---|---|---|
| 0447063 A2 | 9/1991 | European Pat. Off. | H04L 9/08 |
| 0604911 A2 | 7/1994 | European Pat. Off. | H04L 9/32 |
| 0739109 A2 | 10/1996 | European Pat. Off. | H04L 9/32 |
| 95/01684 | 1/1995 | WIPO | H04L 9/32 |

*Primary Examiner*—Gilberto Barron, Jr.
*Assistant Examiner*—Justin T. Darrow
*Attorney, Agent, or Firm*—Limbach & Limbach, LLP

[57] ABSTRACT

In authentication using a plurality of cipher keys, the authentication time is shortened. In the case that an encipher key to encipher key are required to take an access to each area out of the area to area in a memory of an IC card, a plurality of areas to have an access is informed to the IC card from a reader writer, a plurality of cipher keys corresponding to these areas (for example, cipher key 1, cipher key 2, and cipher key 4) is read out, and reduction processing section generates one reduction key from these cipher keys. A random number which is generated from a random number generation section of the reader writer is transferred to the IC card, and an encipherment section enciphers the random number using the reduction key. The reader writer receives the enciphered random number from the IC card, and deciphers it using the reduction key, and judges the IC card to be proper if the deciphered random number is equal to the generated random number.

22 Claims, 23 Drawing Sheets

REDUCTION KEY GENERATION PROCESSING

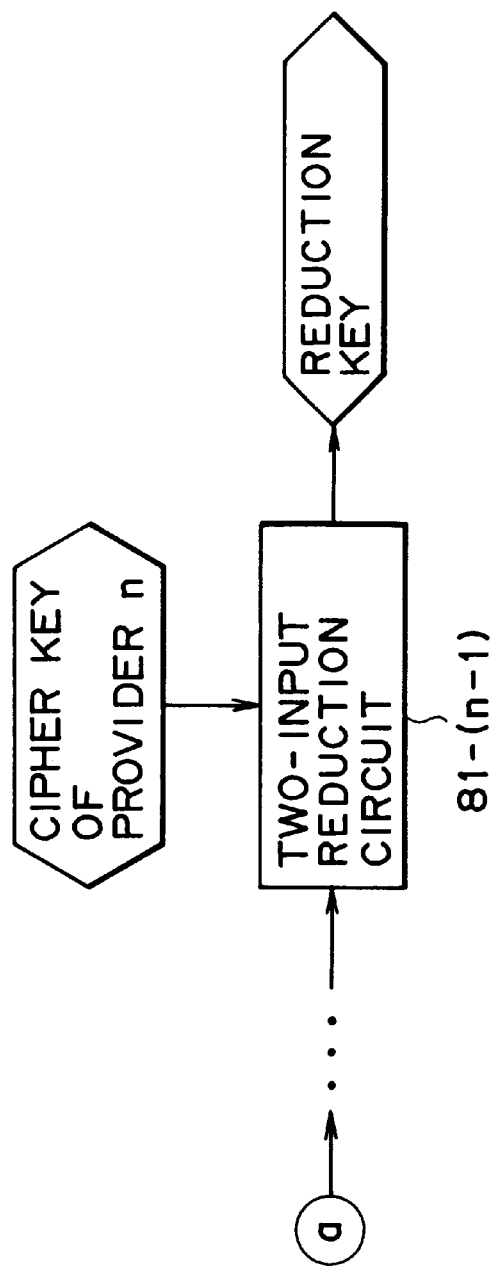
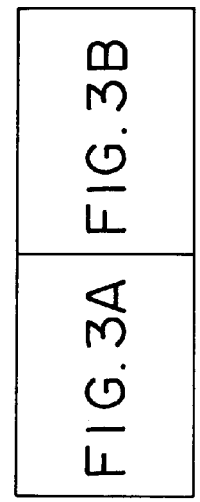

TWO-INPUT REDUCTION CIRCUIT

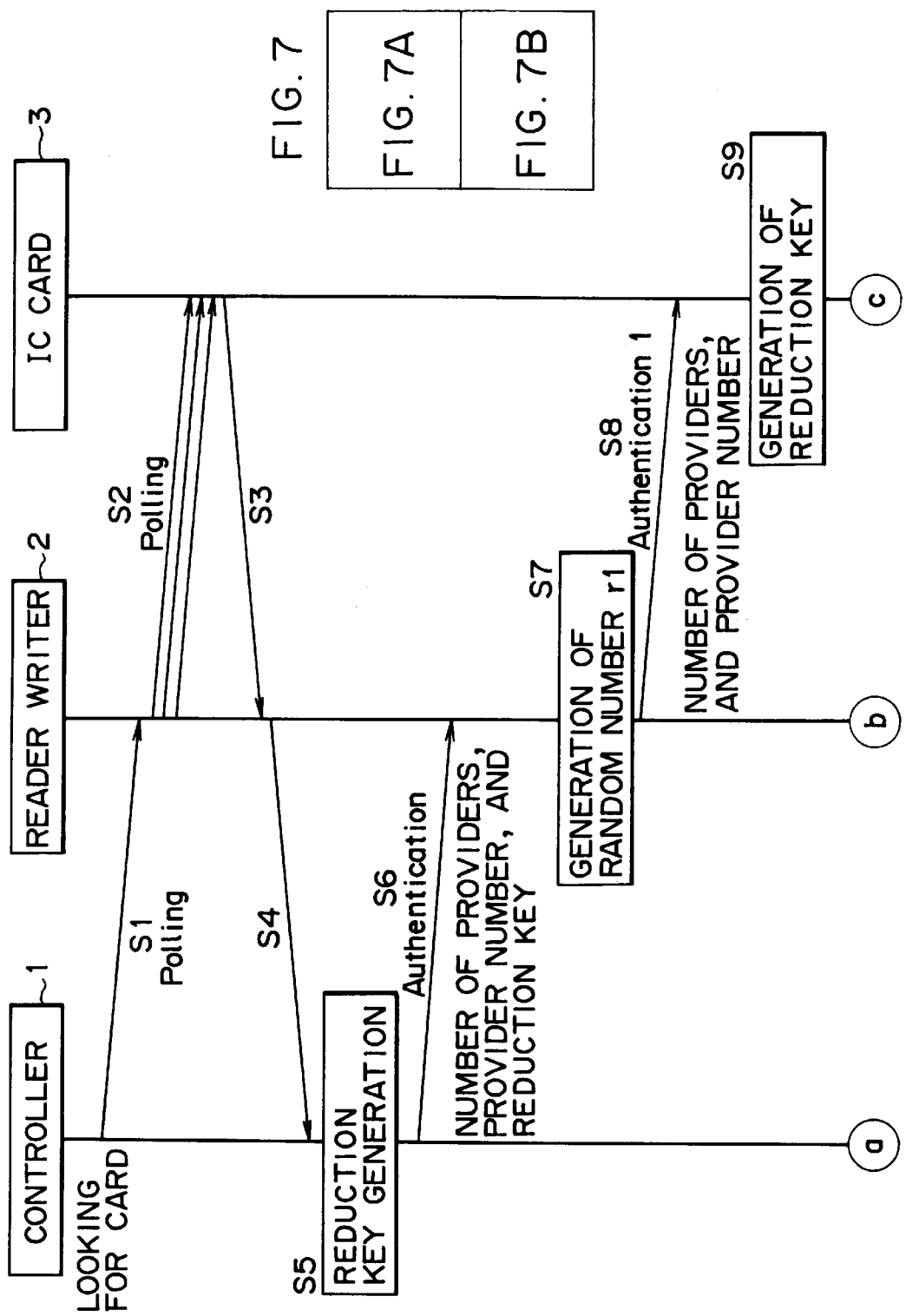

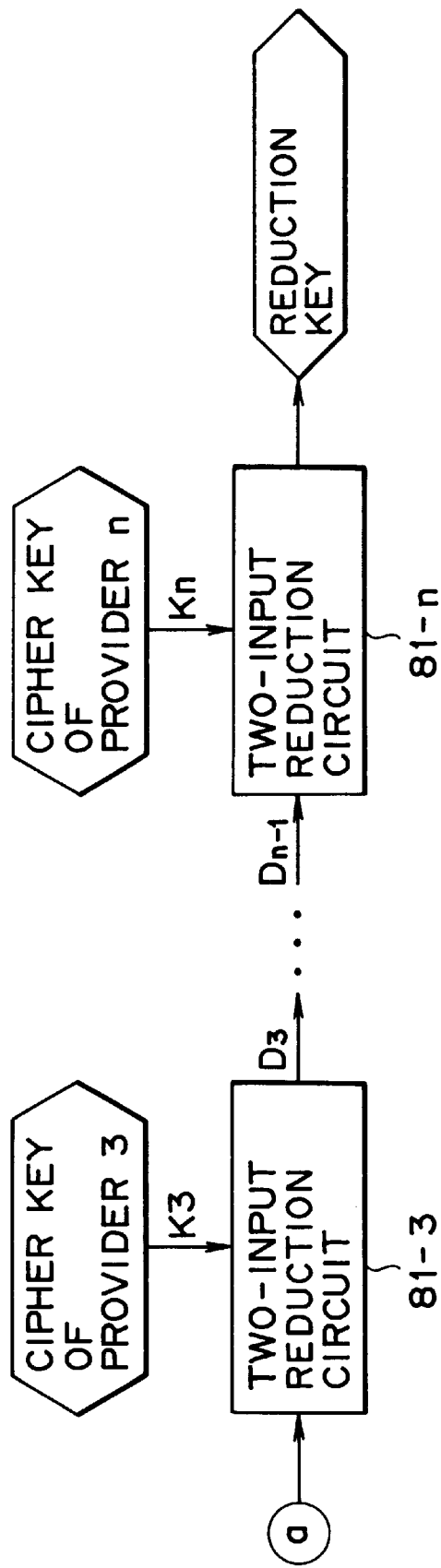
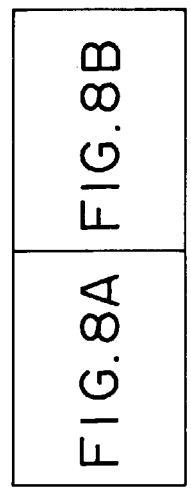
FIG. 8B
FIG. 8

F I G. 12
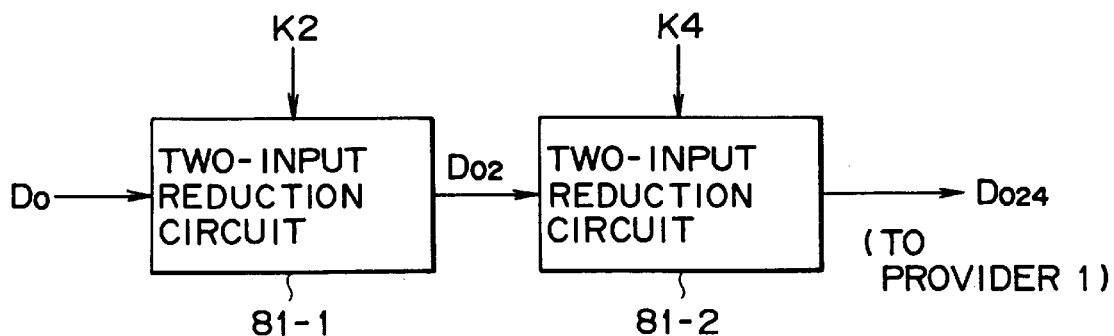
F I G. 13
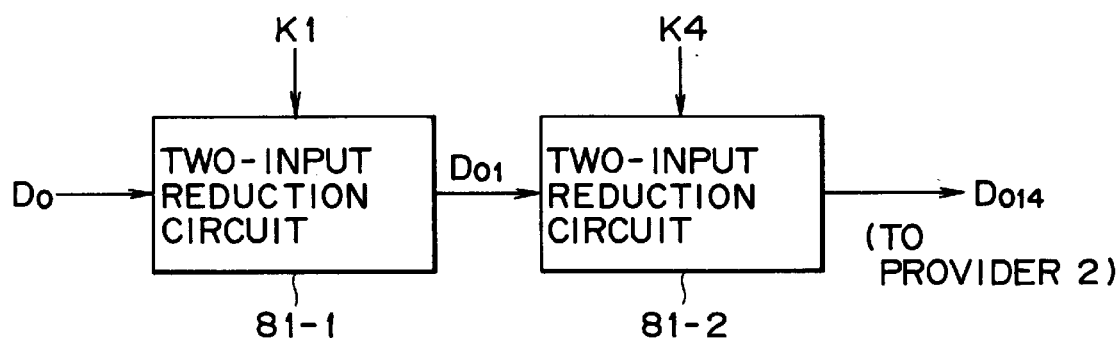
F I G. 14
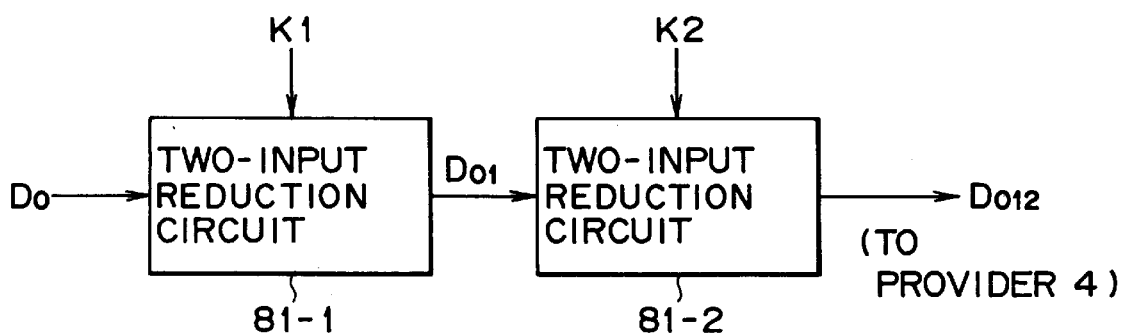

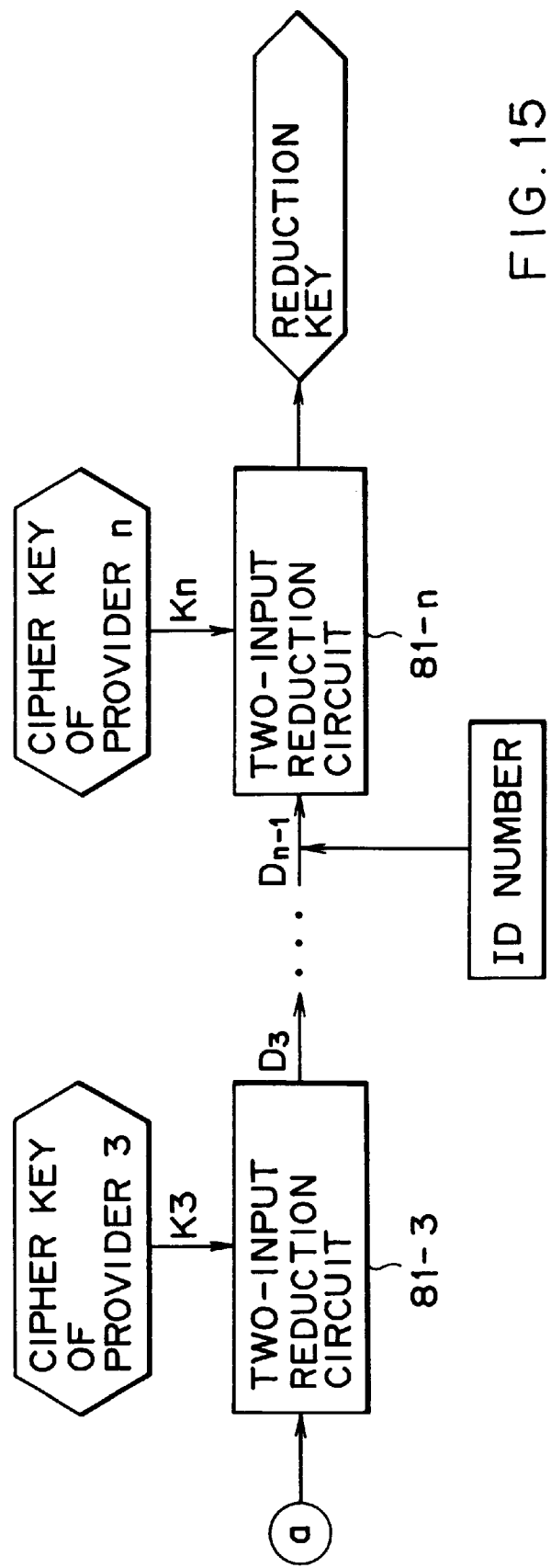
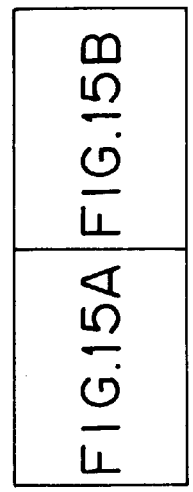
FIG. 15B
FIG. 15
| FIG.15A | FIG.15B |

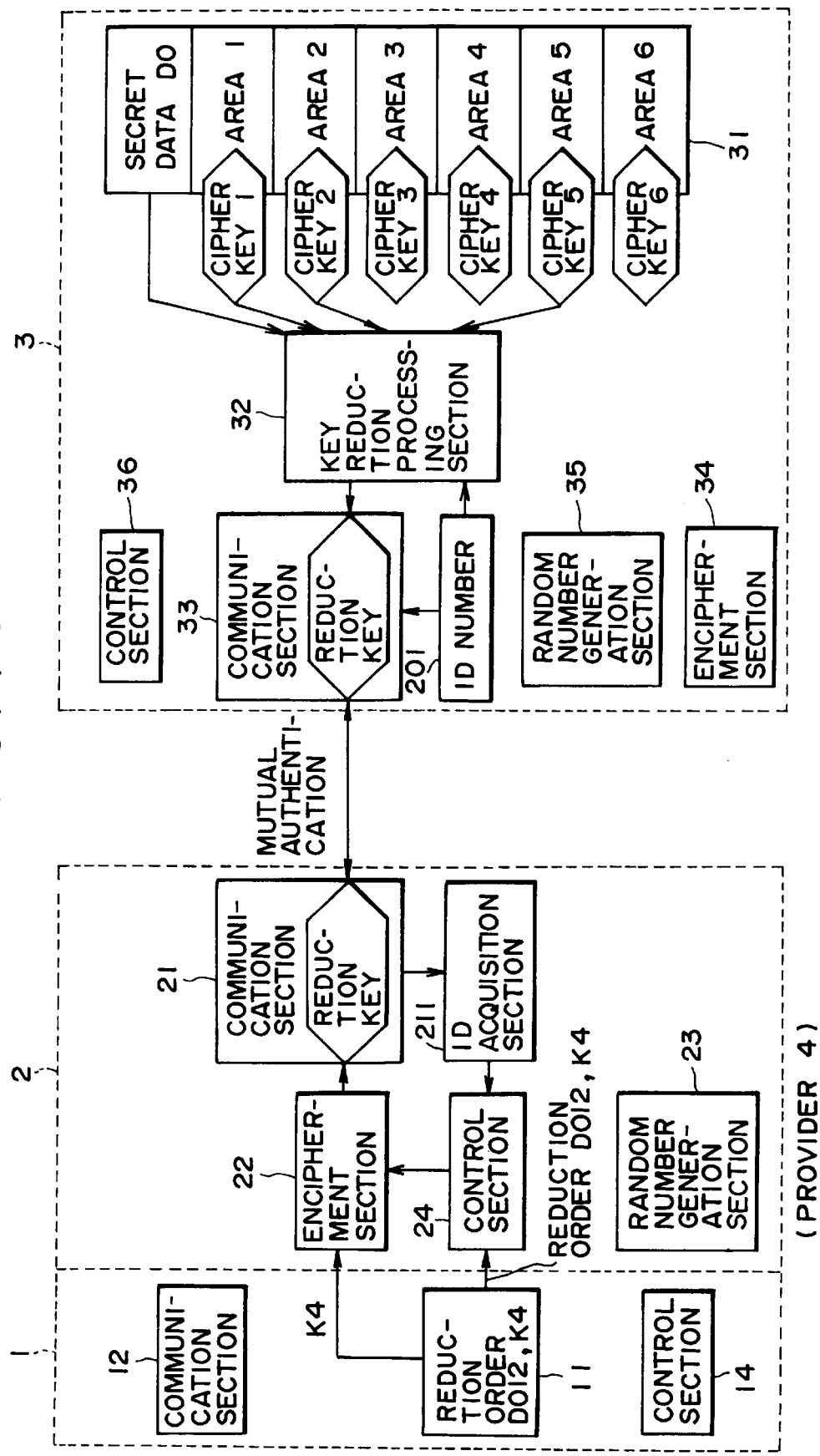

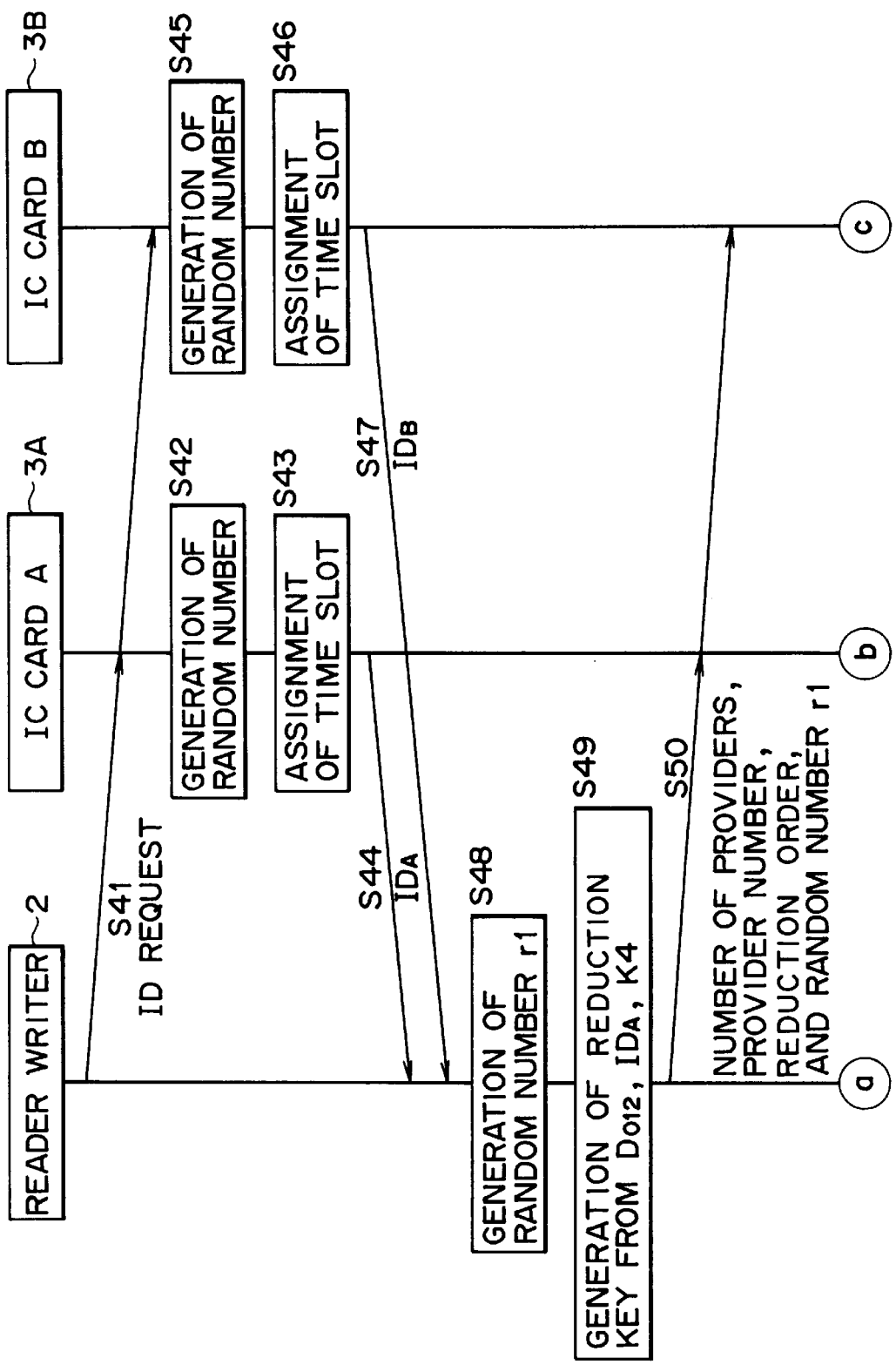

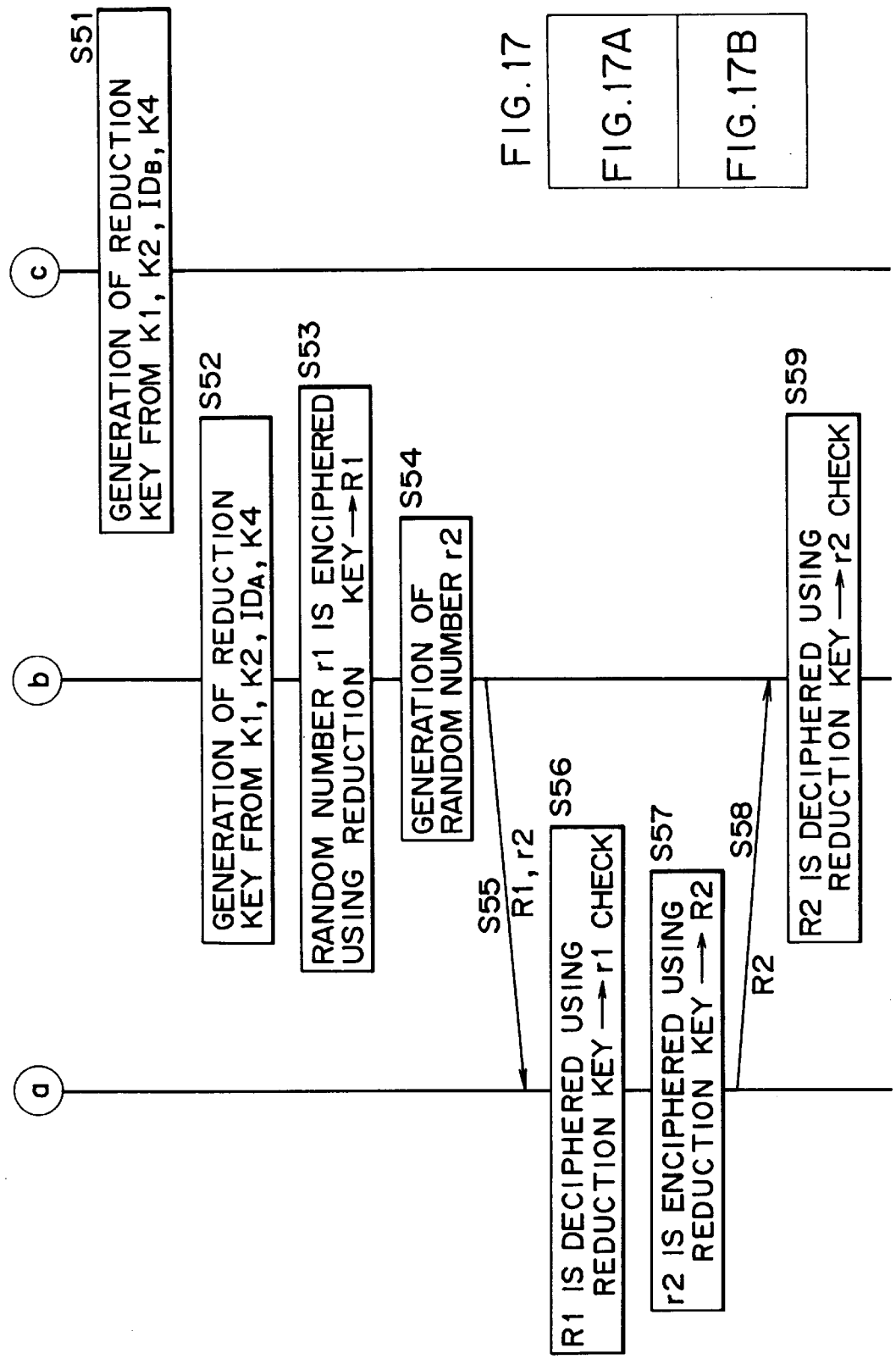

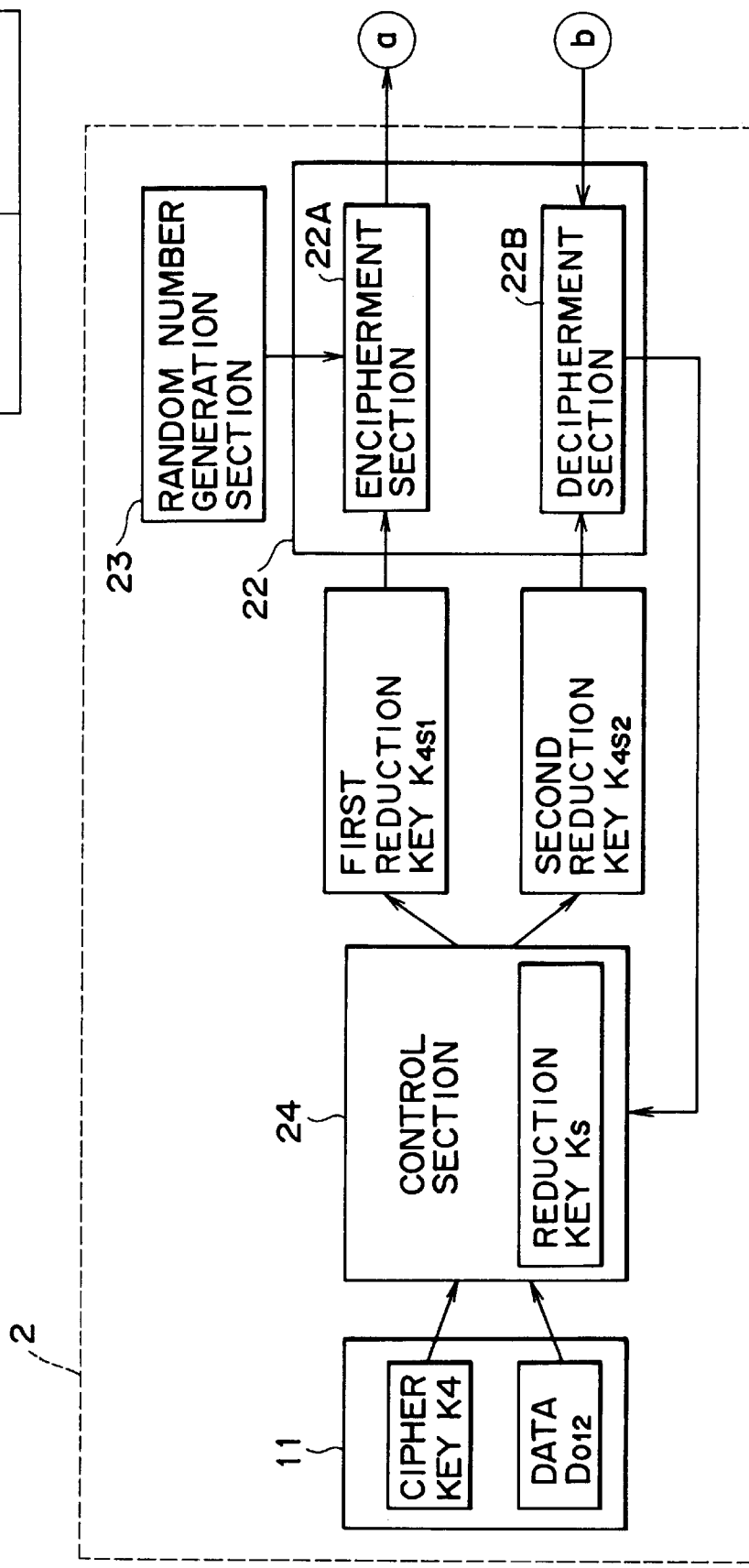

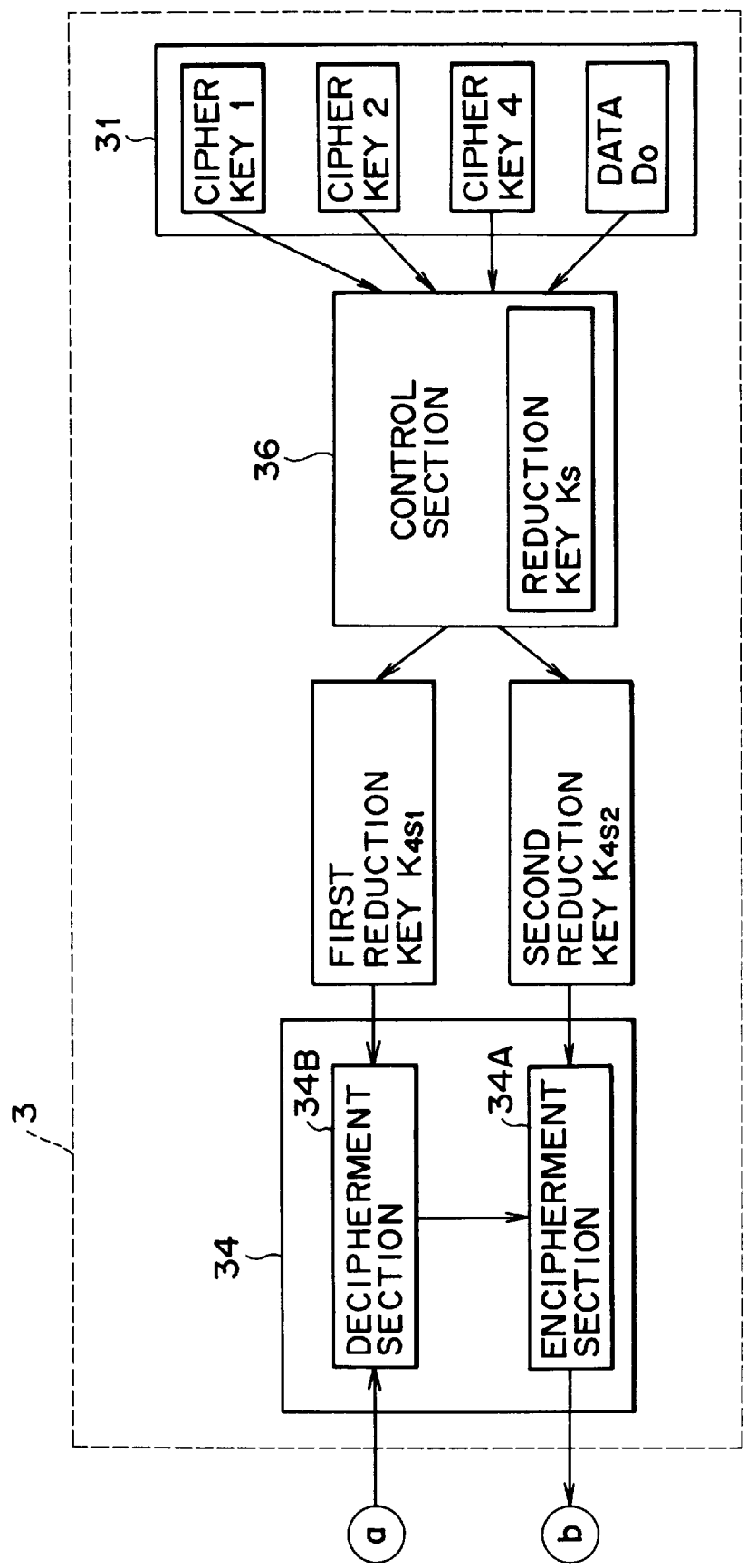

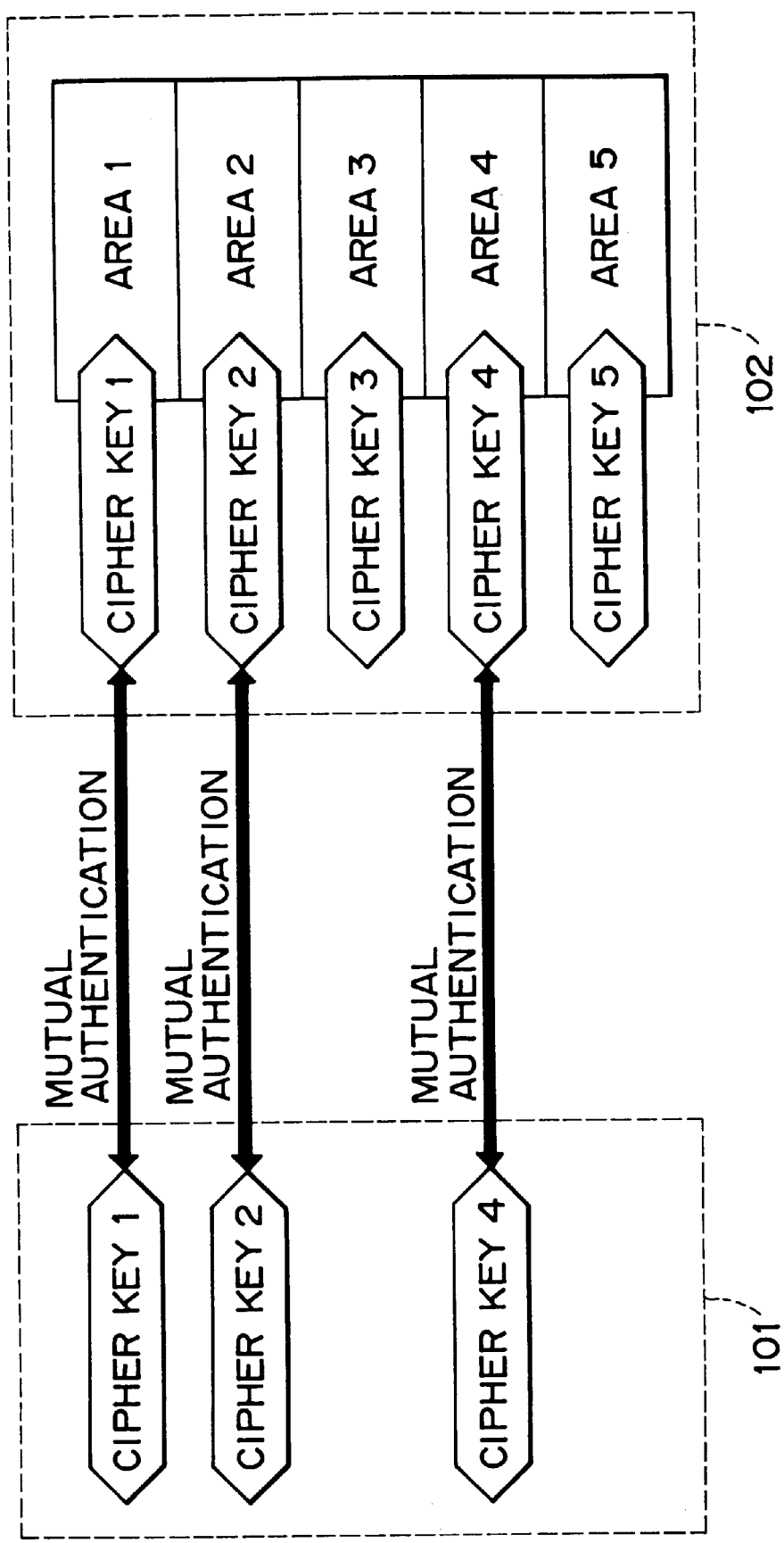

SYSTEM AND METHOD FOR AUTHENTICATION, AND DEVICE AND METHOD FOR AUTHENTICATION

BACKGROUND OF THE INVENTION

This invention relates to a system and method for authentication and device and method for authentication, and particularly relates to a system and method for authentication and device and method for authentication which are capable of authenticating rapidly.

DESCRIPTION OF RELATED ART

FIG. 20 shows an exemplary structure of a conventional authentication system using an IC card. In this exemplary structure, authentication processing is performed between the IC card 102 and reader writer 101. In the IC card 102, the area for storing information is divided into 5 areas of area 1 to area 5. Respective areas correspond to different cipher key 1 to key 5. To take an access to area i, the corresponding cipher key i is required.

When the reader writer 101 records a data in, for example, area 1 of the IC card, or reads a data stored therein, first mutual authentication processing is performed. The reader writer 101 previously stores the same cipher key 1 to cipher key 5 as the cipher key 1 to cipher key 5 stored in the IC card 102. When the reader writer 101 takes an access to area 1 of the IC card 102, the reader writer 101 reads the cipher key 1 corresponding to the area 1 and performs an authentication processing using this key.

For example, the reader writer 101 generates a prescribed random number, and informs the random number and the number of 1 of the area to be addressed to the IC card 102. The IC card 102 reads the cipher key 1 corresponding to the informed number of 1, enciphers the random number using the cipher key 1. The enciphered random number is informed to the reader writer 101. The reader writer 101 deciphers the ciphered random number using the cipher key. If the random number informed to the IC card 102 coincides with the deciphered random number, the IC card 102 is judged to be proper.

Similarly, the IC card 102 generates a prescribed random number, and outputs it to the reader writer 101. The reader writer 101 enciphers the random number using the cipher key 1, and informs the enciphered random number to the IC card 102. The IC card 102 deciphers the enciphered random number using the cipher key 1. If the deciphered random number is coincident with the random number posted to the reader writer 101, the reader writer 101 is determined to be a proper reader writer.

The processing described above is performed on respective areas.

In the conventional system, it has been difficult to take an access to areas rapidly because mutual authentication processing is performed individually for each area. As the result, it has been difficult that a reader writer 101 makes an access to a prescribed area of the IC card 102 and then writes and reads information in a short time, for example, when a commuter passes a gate installed at a ticket gate.

The present invention was accomplished in view of such a problem, and it is the object of the present invention to shorten the time for authentication.

SUMMARY OF THE INVENTION

Embodiments of the present invention are described hereinafter. In the description, features of the present invention are described with a corresponding embodiment (one example) in parentheses after each means in order for clear understanding of mutual correspondence between respective means described in claims and embodiments described hereinafter. However, these descriptions by no means limits respective means to those described hereinafter.

An authentication system described in one embodiment comprises the first device and second device. The first device has first memory means (for example, a memory 11 shown in FIG. 1) for storing a plurality of keys, first generation means (for example, a reduction processing section 13 shown in FIG. 1) for generating one authentication key from the arbitrary number of keys out of the plurality of the keys stored in the first memory means, and first communication means (for example, a communication section 12 shown in FIG. 1) for communicating with the second device. The second device has second memory means (for example, a memory 31 shown in FIG. 1) for storing a plurality of keys, second generation means (for example, a reduction processing section 32 shown in FIG. 1) for generating one authentication key from the arbitrary number of keys out of the plurality of the keys stored in the first memory means, and second communication means (for example, a communication section 33 shown in FIG. 1) for communicating with the first device. The one device (for example, an IC card 3 shown in FIG. 1) out of the first device and second device has encipherment means (for example, encipherment section 34 shown in FIG. 1) for enciphering using the authentication key, and the other device (for example, a controller 1 and reader writer 2 shown in FIG. 1) out of the first device and second device has decipherment means (for example, encipherment section 22 shown in FIG. 1) for deciphering data enciphered by the encipherment means using the authentication key.

In the above-mentioned authentication system, one authentication key is generated from a plurality of keys. Data are enciphered and deciphered using the one authentication key.

In the authentication system described in another embodiment, the one device out of the first device and second device additionally has notification means (for example, the step S6 shown in FIG. 7) for notifying information required to generate one corresponding authentication key from arbitrary number of keys out of the plurality of the keys stored therein to the other device. The other device out of the first device and second device generates the authentication key corresponding to the information informed from the notification means.

In the authentication system described in yet another embodiment, at least any one device of the first device and second device is provided with a random number generation means (for example, random number generation sections 23 and 35 in FIG. 1) for generating a random number, and the encipherment means enciphers a random number generated by the random number generation means, and the decipherment means deciphers the enciphered random number.

An authentication device described in still another embodiment has communication means (for example, a communication section 21 shown in FIG. 1) for communicating between the other device, memory means (for example, the memory 11 shown in FIG. 1) for storing a plurality of keys, generation means (for example, the reduction means 13 shown in FIG. 1) for generating one authentication key from the arbitrary number of keys out of a plurality of the keys stored in the memory means, notification means (for example, the communication section 12 shown in FIG. 1) for notifying information required to generate one corresponding authentication key from the arbitrary number of keys out of the plurality of the keys stored in the other device and data to be enciphered using the authentication key to the other device, and decipherment means (for example, the encipherment section 22 shown in FIG. 1) for deciphering, using the authentication key, the data enciphered by the other device using the authentication key.

In the above-mentioned authentication device, information required to generate one authentication key is informed to other device. Data enciphered using an authentication key generated by other device are deciphered using the authentication key.

An authentication device described in another embodiment has communication means (for example, the communication section 33 shown in FIG. 1) for communicating between the other device, a memory means (for example, the memory 31 shown in FIG. 1) for storing a plurality of keys, generation means (for example, the reduction processing section 32 shown in FIG. 1) for generating one authentication key from the arbitrary number of keys out of the plurality of the keys stored in the memory means based on information informed from the other device, and encipherment means (for example, the encipherment section 34 shown in FIG. 1) for enciphering the data informed from the other device using the authentication key.

In the above-mentioned authentication device, one authentication key is generated from a plurality of keys based on the information informed from the other device.

In an authentication system described in still another embodiment, the first device stores a key assigned to this device and has first memory means (for example, a memory 11 shown in FIG. 9) for storing a key assigned to this device and individual data generated using a prescribed common data and a prescribed number of keys held by the second device, first generation means (for example, a reduction processing section 13 shown in FIG. 9) for generating an authentication key from the key stored in the first memory means and the individual data, first notification means (for example, a control section 24 shown in FIG. 9) for notifying information required for the other device to generate corresponding the key, and a first communication means (for example, a communication section 21 shown in FIG. 9) for communicating between the second device. The second device is provided with a second memory means (for example, a memory 31 shown in FIG. 9) for storing a plurality of keys and the common data, a second generation means (for example, a reduction processing section 32 shown in FIG. 9) for generating the authentication key from a key corresponding to the information from the communication means of the first device out of the plurality of the keys stored in the second memory means and the common data, and a communication means (for example, a communication section 33 shown in FIG. 9) for communicating between the first device. The one device out of the first device and second device is provided with an encipherment means (for example, an encipherment section 22 shown in FIG. 9) for enciphering using the authentication key, and the other device out of the first device and second device is provided with a decipherment means (for example, an encipherment section 34 shown in FIG. 9) for deciphering the data enciphered by the encipherment means using the authentication key.

In the above-mentioned authentication system, a key assigned to this device and individual data are stored in the first device, and an authentication key is generated correspondingly to these key and data. In the second device, an authentication key is generated from the information received from the first device and common data.

In the authentication system described in yet another embodiment, an authentication key comprises a first authentication key and second authentication key. The first generation means generates the first authentication key from the key stored in the first memory means assigned thereto and the individual data, and generates the second authentication key using the key assigned thereto and the first authentication key. The second generation means generates the first authentication key from a key corresponding to the of information from the notification means of the first device out of the plurality of the keys stored in the second memory means and the common data, and generates the second authentication key using the first authentication key and a key corresponding to the information from the notification means of the first device. Both the first device and second device are provided with the encipherment means and decipherment means respectively, the one device out of the first device and second device is provided additionally with a random number generation means (for example, the random number generation section 23 shown in FIG. 9) for generating a random number. An encipherment means of the one device out of the first device and second device enciphers the random number generated from the random number generation means of the one device out of the first device and second device (¥2) using the first authentication key, a decipherment means of the other device out of the first device and second device deciphers the random number enciphered by the encipherment means of the one device out of the first device and second device using the first authentication key, an encipherment means of the other device out of the first device and second device enciphers the random number deciphered by the decipherment means of the other device out of the first device and second device using the second authentication key, and a decipherment means of the one device out of the first device and second device deciphers the random number enciphered by the encipherment means of the other device out of the first device and second device using the second authentication key.

In the authentication system described in another embodiment, the second device is provided additionally with the second decipherment means (for example, an encipherment section 34 shown in FIG. 18) for deciphering the first enciphered data and second enciphered data received from the first communication means of the first device using the first key corresponding to the key identification number, and a changing means (for example, a control section 36 shown in FIG. 18) for judging whether the second key and third key are in a prescribed relation and for changing the first key using the second key correspondingly to the judgement result.

An authentication device described in yet another embodiment provided with a memory means (for example, the memory 11 shown in FIG. 19) for storing a key assigned to this device and storing individual data generated using a prescribed common data and a prescribed number of keys held by the other device, a generation means (for example, the reduction processing section 13 shown in FIG. 9) for generating an authentication key from the key stored in the memory means and the individual data, notification means (for example, the control section 24 shown in FIG. 9) for notifying information required for the other device to generate the corresponding authentication keys, a communication means (for example, the communication section 21 shown in FIG. 9) for communicating between the other device, and an encipherment means (for example, the encipherment section 22 shown in FIG. 9) for enciphering using the authentication key.

An authentication device described in still another embodiment is provided with a memory means (for example, the memory 31 shown in FIG. 9) for storing a plurality of keys and common data, a generation means (for example, the reduction processing section 13 shown in FIG. 9) for generating an authentication key from a key corresponding to the information from the other device out of the plurality of the keys stored in the memory means and the common data, a communication means (for example, the communication means 21 shown in FIG. 9) for communicating between the other device, and, a decipherment means (for example, the encipherment section 34 shown in FIG. 9) for deciphering the data enciphered by the other device using the authentication key.

In the above-mentioned authentication device, an authentication key is generated from a key corresponding to the information from the other device and common data.

The authentication device described in another embodiment, the second decipherment means and changing means are additionally provided, when the first enciphered data which is generated by enciphering the second key using the first key and the second enciphered data which is generated by enciphering the third key having a prescribed relation to the second key using the first key are transmitted, together with the key identification number of the key to be changed, from the other device in order to change the first key out of the plurality of the keys stored in the memory means, the second decipherment means (for example, the encipherment section 34 shown in FIG. 18) deciphers the first enciphered data and second enciphered data using the first key corresponding to the key identification number of the key to be changed, and the changing means (for example, the control section 36 shown in FIG. 18) judges whether the deciphered second key and third key are in a prescribed relation and changes the first key using the second key correspondingly to the judgement result.

BRIEF DESCRIPTION OF THE DRAWINGS

FIGS. 3A and 3B are block diagrams for illustrating an exemplary structure of a reduction processing section 13 shown in FIG. 1.

FIGS. 7A and 7B are timing charts for describing operations of the authentication system shown in FIG. 1.

FIGS. 8A and 8B are block diagrams for illustrating another exemplary structure of the reduction processing section 13 shown in FIG. 1.

FIG. 12 is a block diagram for illustrating generation of data to be stored in a memory 11 shown in FIG. 9.

FIG. 13 is a block diagram for illustrating generation of data to be stored in a memory 11 shown in FIG. 10.

FIG. 14 is a block diagram for illustrating generation of data to be stored in a memory 11 shown in FIG. 11.

FIGS. 15A and 15B are block diagrams for illustrating yet another exemplary structure of the reduction processing section 13 shown in FIG. 1.

FIG. 16 is a block diagram for illustrating an exemplary structure of an authentication system of the provider 4 in the case that a reduction key is generated by the method shown in FIG. 15.

FIGS. 17A and 17B are timing charts for describing operations of the example shown in FIG. 16.

FIGS. 19A and 19B are block diagrams for illustrating another authentication processing.

FIG. 20 is a diagram for illustrating a structure of a conventional authentication system.

DETAILED DESCRIPTION OF THE PREFERRED EMBODIMENTS

Figure 1:
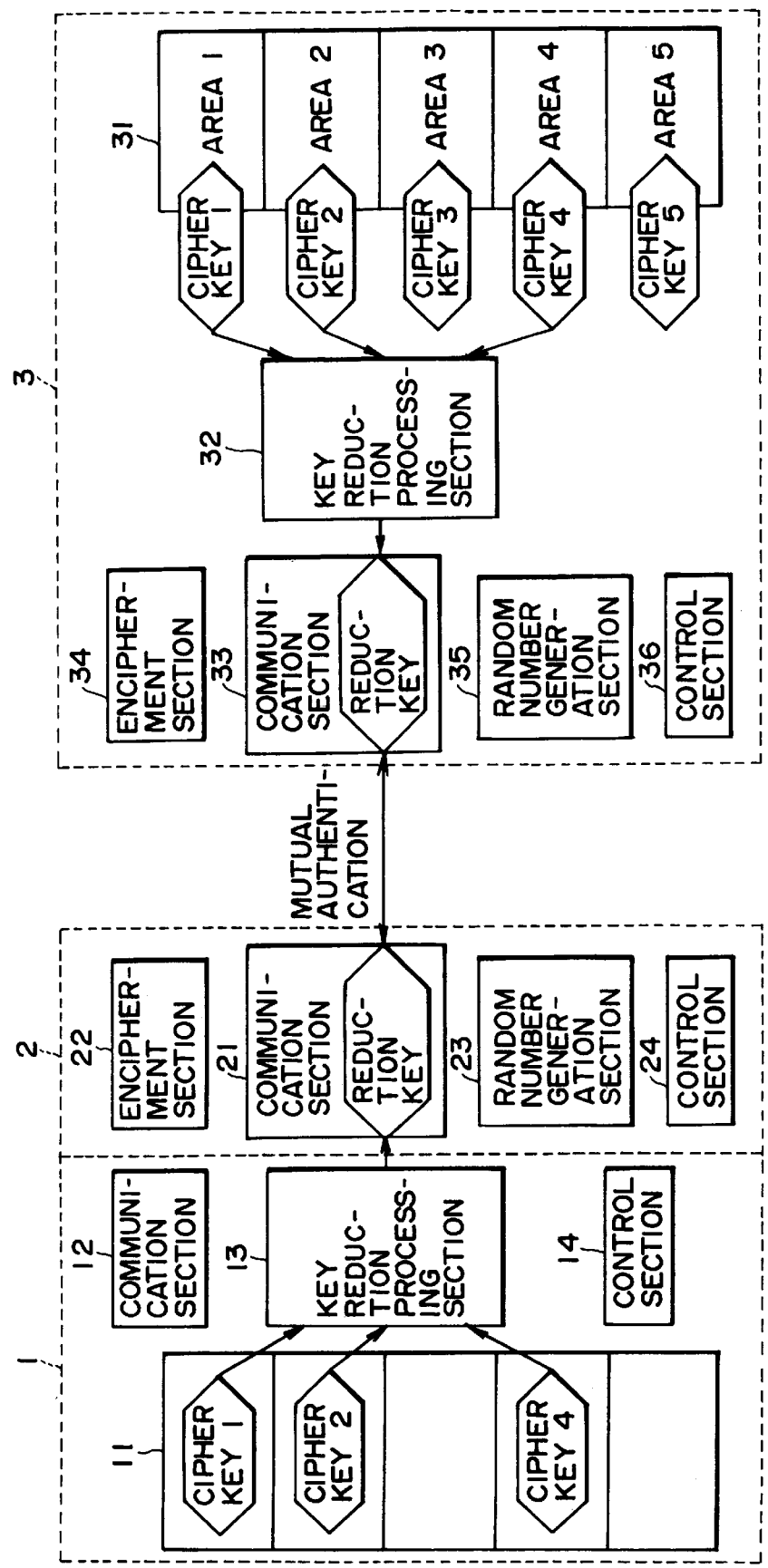
FIG. 1 is a block diagram for illustrating an exemplary structure of an authentication system of the present invention.

FIG. 1 shows an exemplary structure of an authentication system of the present invention. The system comprises a controller 1, reader writer 2, and IC card 3. A user instead of a commutation ticket, for example, carries the IC card 3. The reader writer 2 is installed at a ticket gate of a rail way company who employs the IC card 3. In this specification, the term "system" means a whole apparatus having a plurality of devices.

The controller 1 is provided with a memory 11, which stores cipher keys for access to areas of a memory 31 of the IC card 3, and corresponding provider numbers. A communication section 12 communicates between a communication section 21 of the reader writer 2 by wire or radio transmission. A reduction processing section 13 reads a cipher key of a prescribed number out of a plurality of cipher keys stored in the memory 11, and generates one reduction key. A controller 14 controls operations of components in the controller 1, and performs authentication processing.

The communication section 21 of the reader writer 2 communicates between the communication section 12 of the controller 1 or a communication section 33 of the IC card 3. An encipherment section 22 enciphers a random number generated from a random number generation section 23, and deciphers an enciphered random number transmitted from the IC card 3. A control section 24 controls operations of components of the reader writer 2, and performs authentication processing.

The IC card 3 is provided with the memory 31. The memory 31 is divided into a plurality of areas (for example 5 areas in FIG. 1). Each provider (for example, Railway Company) takes an access to the corresponding area, and writes and reads data as desired. Each area corresponds to a specific cipher key, and a corresponding cipher key i is required to take an access to a specified area i.

A reduction processing section 32 reduces a plurality of cipher keys, and generates one reduction key. An encipherment section 34 enciphers a random number generated by random number generation section 35, and deciphers the enciphered data supplied from the reader writer 2. A controller 36 controls operations of components of the IC card 3, and performs authentication processing.

Figure 2:
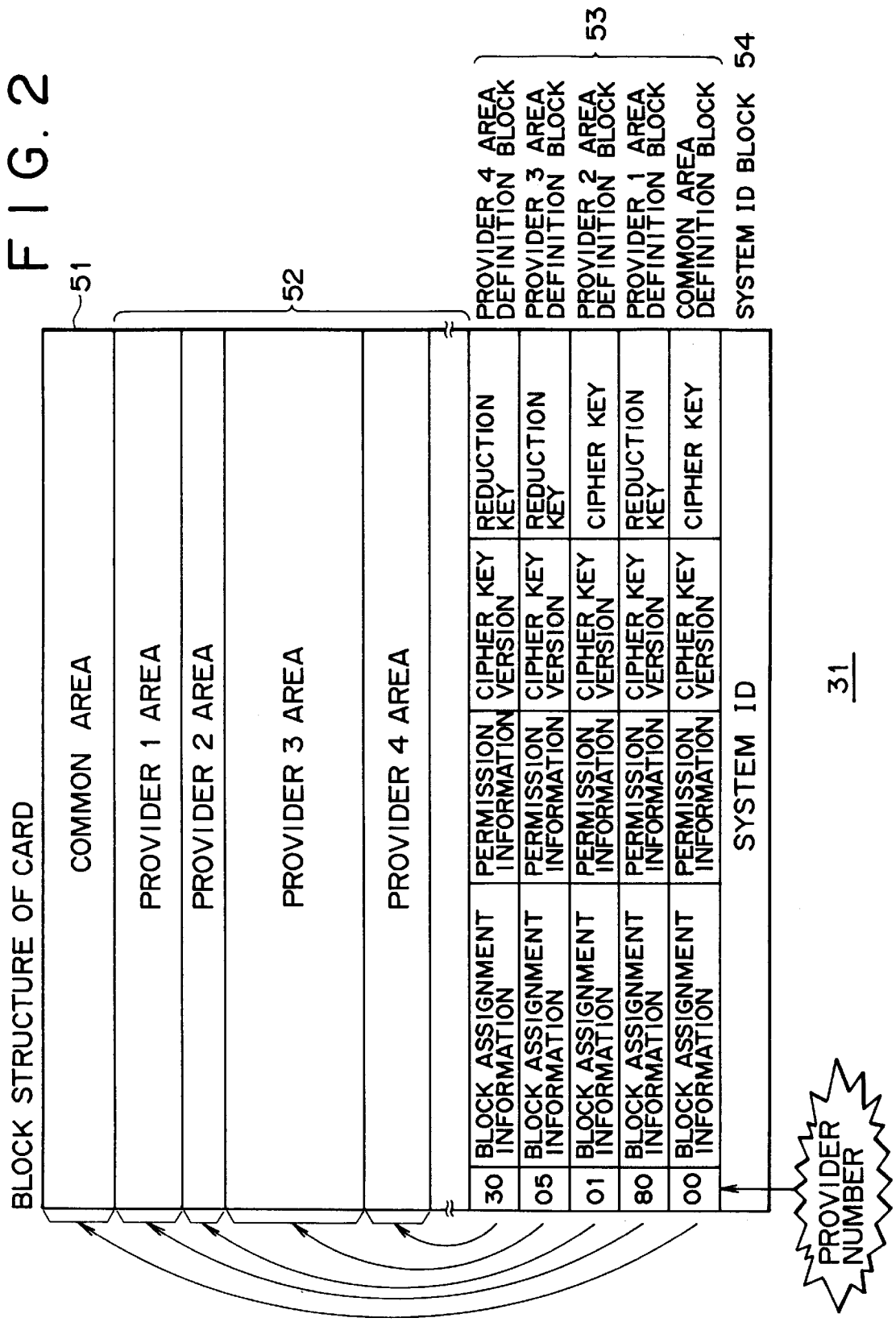
FIG. 2 is a diagram for illustrating an exemplary data structure of the memory 31 shown in FIG. 1.

FIG. 2 shows a detailed example of a data structure of the memory 31 of the IC card 3. In this example, the area 51 is assigned as a common area, in which data common to respective providers are stored. The area 52 is assigned as an area for exclusive use by respective providers, and only the provider corresponding to a specific area can make an access to this area.

In an area 53, information required to manage the area 51 and area 52 is recorded. The information comprises provider numbers assigned to respective providers, block assignment information for indicating the area which is assigned to the provider, permission information such as that only reading is possible, only writing is possible, or both reading and writing are possible, cipher key, and version of the cipher key.

For example, the provider number 00 is common to respective providers, and as the block assignment information, an address of the area 51, which is the common area, is written. As the permission information, information which is possible to take an access to the area 51, which is the common area, is specified. Further, as the version information of the cipher key, the cipher key required to take an access to the area 51, which is the common area, and the version thereof are specified.

An area 54 is assigned as a system ID block, and an ID of a system to which this IC card 3 is applied is written.

The provider number, permission information, cipher key version, and cipher key shown in FIG. 2 are stored in the memory 11 of the controller 1.

Figure 3A:
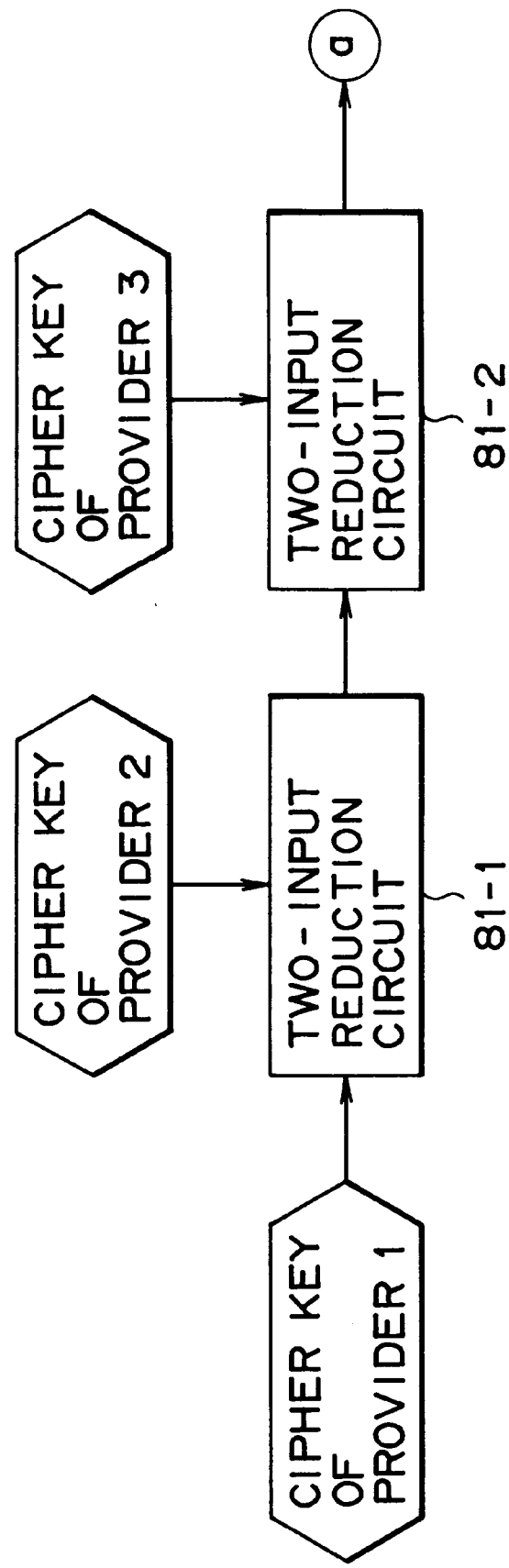

FIGS. 3A and 3B show an exemplary structure of the reduction processing section 13 (or reduction processing section 32). The processing is performed actually by software in many cases.

In the reduction processing section 13 or 32, in the case that n cipher keys are provided in the IC card 3, (n−1) circuits of two-input reduction circuits 81-1 to 81-(n−1) are provided, two data are inputted to each reduction circuit, and one data is outputted. In the two-input reduction circuit 81-1, a cipher key of the provider 1 (rail way company 1) and a cipher key of the provider 2 (rail way company 2) are inputted. The two-input reduction circuit 81-1 generates one reduction key from the two cipher keys, and supplies it to the subsequent two-input reduction circuit 81-2. The two-input reduction circuit 81-2 reduces the reduction key inputted from the two-input reduction circuit 81-1 and a cipher key of the provider 3 (rail way company 3), and outputs it to the subsequent two-input reduction circuit 81-3 (not shown in the drawing). The same processing is performed in each two-input reduction circuit 81-i, and the reduction key generated from the final two-input reduction circuit 81-(n−1) is regarded as one final reduction key.

If n=1 (one cipher key is involved), the input cipher key is outputted, as it is, as a reduction key.

Figure 4:
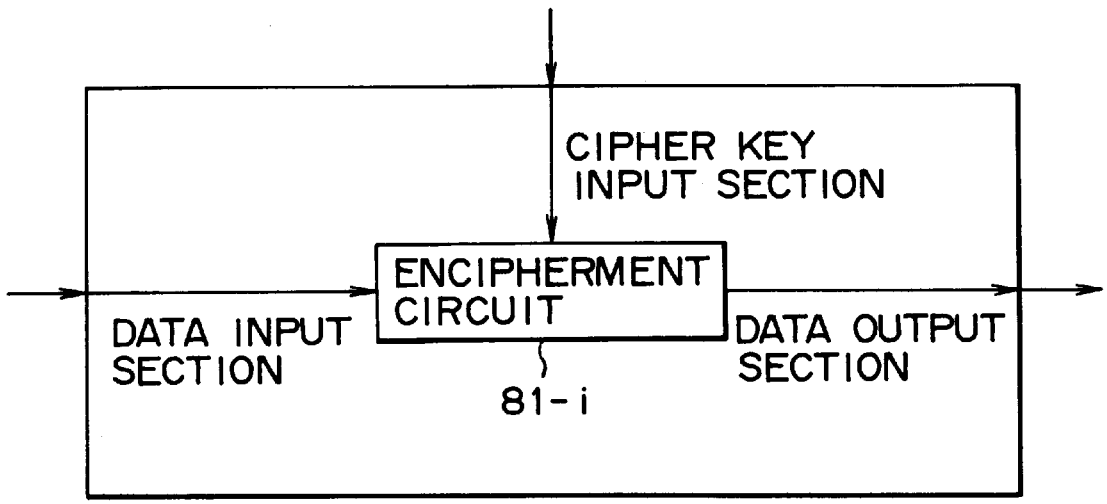
FIG. 4 is a block diagram for illustrating an exemplary structure of a two-input reduction circuit shown in FIG. 3.
Figure 5:
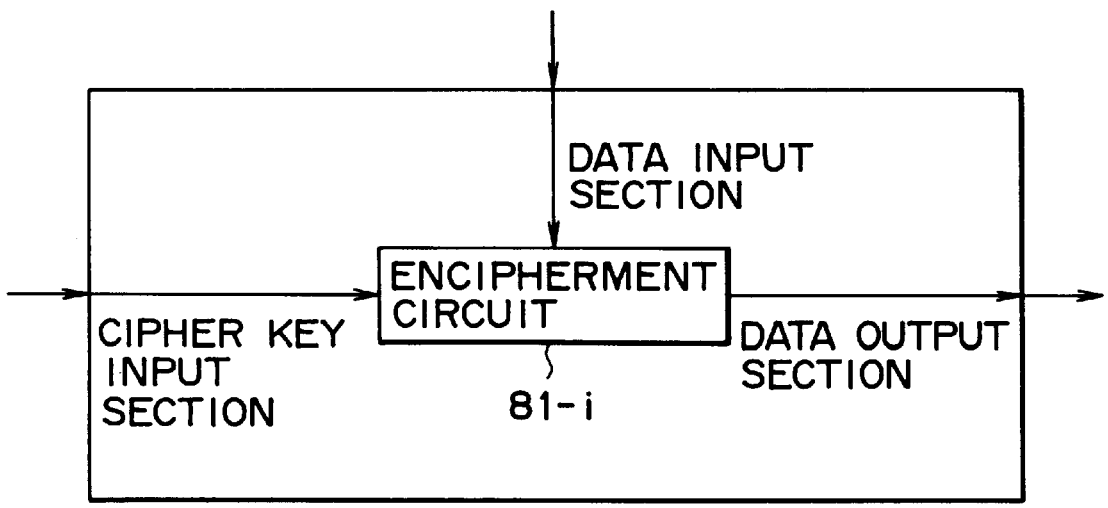
FIG. 5 is a block diagram for illustrating an exemplary structure of a two-input reduction circuit shown in FIG. 3.
Figure 6:
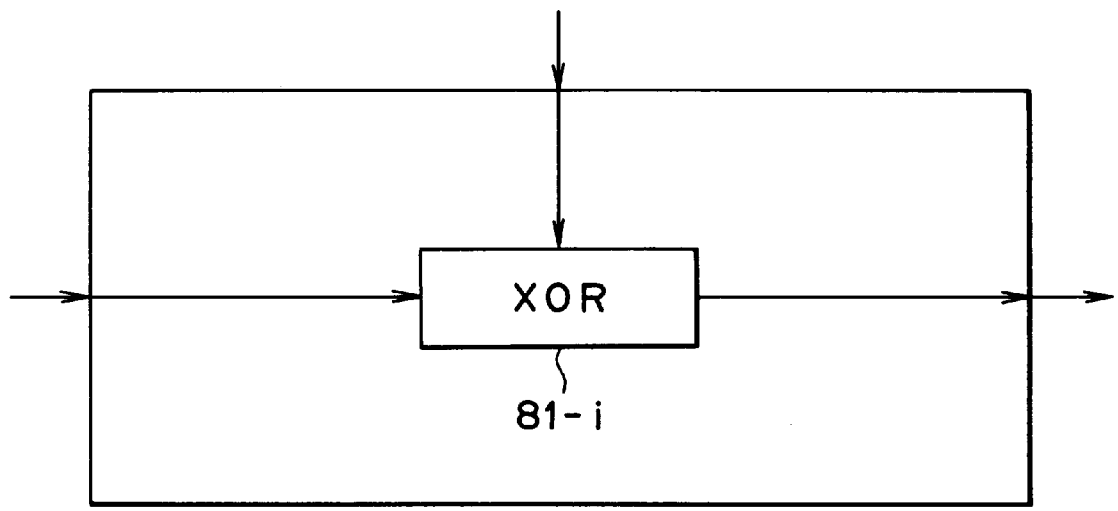
FIG. 6 is a block diagram for illustrating an exemplary structure of a two-input reduction circuit shown in FIG. 3.

FIGS. 4 to 6 show exemplary structures of the two-input reduction circuit 81-i shown in FIG. 3. An encipherment circuit 81-i shown in FIG. 4 enciphers an input from the front end corresponding to a cipher key prepared previously, and outputs it to the rear end. For example, if the two-input reduction circuit 81-1 comprises the encipherment circuit 81-i, a cipher key of the provider 1 is inputted as a data, and a cipher key of the provider 2 is inputted as a cipher key. The cipher key (data) of the provider 1 is enciphered and outputted to the two-input reduction circuit 81-2.

An encipherment circuit 81-i shown in FIG. 5 receives the input from the front end, enciphers it, and outputs it to the rear end. For example, if the encipherment circuit 81-i is applied to the two-input reduction circuit 81-1, a cipher key of the provider 2 is inputted as a data, and a cipher key of the provider 1 is inputted as a cipher key. The cipher key of the provider 2 is enciphered using the cipher key of the provider 1, and outputted to the subsequent two-input reduction circuit 81-2 as a reduction key.

For example, DES (Data Encryption Standard) and FEAL (Fast Data Encipherment Algorithm) are used as an encipherment method shown in FIGS. 4 and 5.

In FIG. 6, the encipherment circuit 81-i comprises an exclusive OR circuit (XOR). For example, if the encipherment circuit 81-i is applied to the two-input reduction circuit 81-1 shown in FIG. 3, an exclusive OR of the cipher key of the provider 1 and the cipher key of the provider 2 is mathematically operated, and the mathematical operation result is outputted to the subsequent two-input reduction circuit 81-2 as a reduction key.

In FIG. 3, an cipher key of each provider is a digital data having 30 bytes. In this case, also a reduction key is a digital data having the same bytes.

Figure 7B:
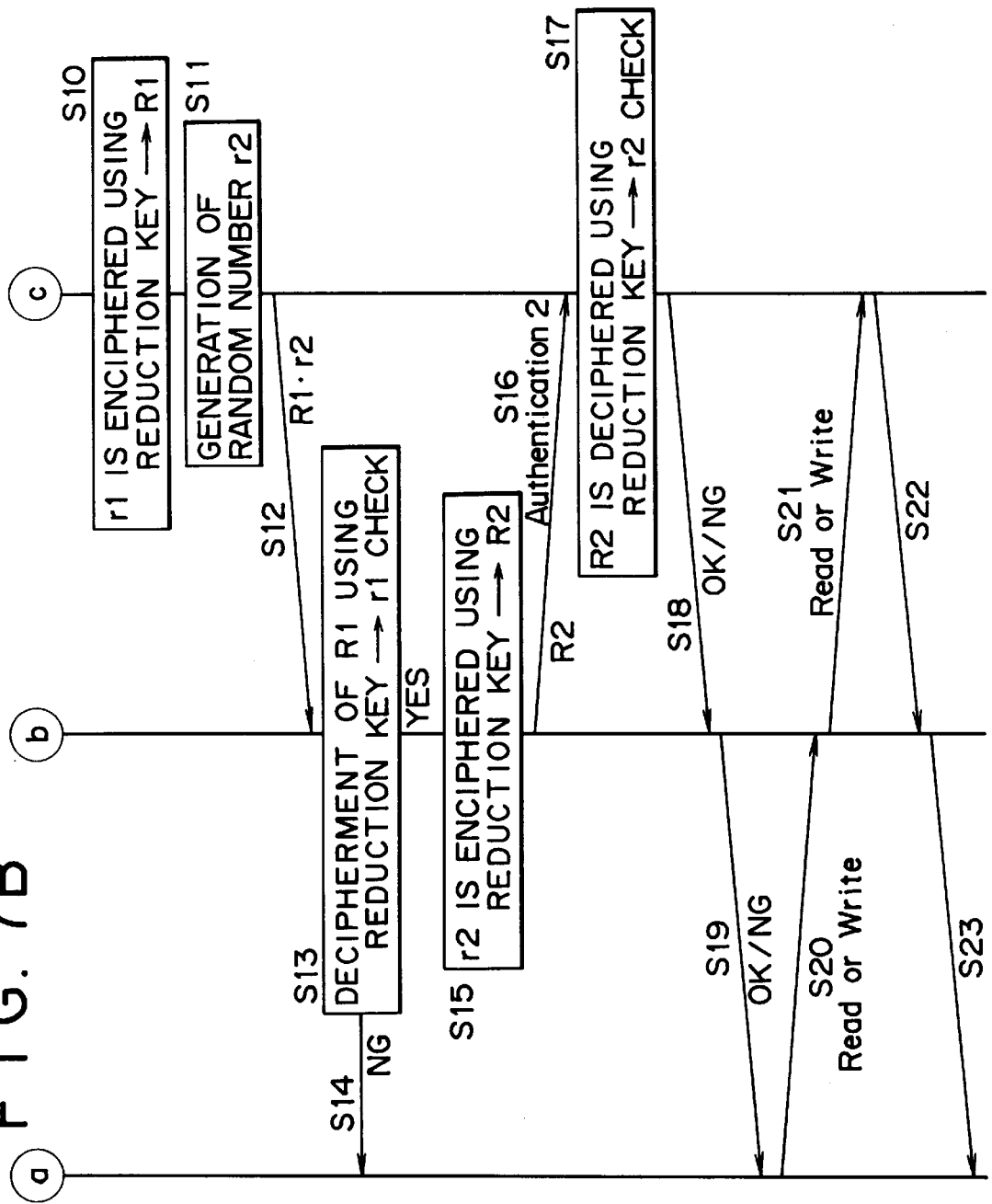

Next, operations are described with reference to a timing chart shown in FIGS. 7A and 7B. The controller 1 and reader writer 2 are shown as separate devices in this embodiment, however, it is possible to use these devices as one combined device.

The controller section 14 of the controller 1 controls the communication section 12, and indicates polling with a sufficiently short period (period sufficient for detecting passage of users who pass through a ticket gate of a rail way station having an IC card) for the reader writer 2 (step S1). Upon receiving the indication through the communication section 21, the control section 24 of the reader writer 2 controls the communication section 21 to perform polling to the IC card 3 (step S2). Upon receiving indication of polling from the communication section 21 of the reader writer 2 through the communication section 33, the control section 36 of the IC card 3 informs the existence of this control section 36 (step S3). Upon receiving this information from the IC card 3 through the communication section 21, the control section 24 of the reader writer 2 informs the existence of the IC card 3 to the controller 1 (step S4).

Upon receiving this information through the communication section 12, the control section 14 of the controller 1 controls the reduction processing section 13 (step S5). The reduction processing section 13 reads out the cipher key of an area to be addressed from the memory 11. In the example shown in FIG. 1, the cipher key 1, cipher key 2, and cipher key 4 are read out to the reduction processing section 13 to take access to the area 1, area 2, and area 4. The reduction processing section 13 reduces using these three cipher keys. In detail, as shown in FIG. 3, in the two-input reduction circuit 81-1, the cipher key 1 is enciphered using the cipher key 2, and outputted to the two-input reduction circuit 81-2. The two-input reduction circuit 81-2 enciphers the reduction key obtained by reducing the cipher key 1 and cipher key 2 supplied from the two-input reduction circuit 81-1 using the cipher key 3. The obtained reduction key is used as the final reduction key.

When one reduction key is generated as described herein above, the control section 14 informs it to reader writer 2 together with provider numbers (key number), number of providers (number of keys), and order of reduction processing (step S6). Upon receiving this information from the communication section 12 of the controller 1 through the communication section 21, the control section 24 of the reader writer 2 instructs the random number generation section 23 to generate a random number r1 (step S7). The controller 24 instructs the communication section 21 to inform the random number r1 to the IC card 3 (step S8). Then, the control section 24 informs also the number of providers and provider numbers supplied from the controller 1 to the IC card 3.

Upon receiving this information, the controller 36 of the IC card 3 performs first reduction key generation processing (step S9). In detail, the control section 36 reads the cipher key corresponding to the provider number (key number) transmitted from the reader writer 2 from the memory 31, and supplies it to the reduction processing section 32 to perform reduction processing. In the case shown in FIG. 1, because the provider numbers corresponding to the cipher key 1, cipher key 2, and cipher key 4 are transmitted, the cipher key 1, cipher key 2, and cipher key 4 corresponding to these provider numbers respectively are read out from the memory 31, and supplied to the reduction processing section 32. The reduction processing section 32 reduces these three reduction keys in a specified order (for example, in order of input of the providers), and finally generates one reduction key. As the result, the same reduction key as the reduction key generated by the controller 1 in the step S5 is generated in the IC card 3.

Next, the control section 36 outputs the random number r1 informed from the reader writer 2 and the reduction key generated from the reduction processing section 32 to the encipherment section 34, and the encipherment section 34 enciphers the random number r1 using the reduction key (step S10) to generates an enciphered random number R1.

The control section 36 generates a prescribed random number r2 in the random number generation section 35 (step S11). The control section 36 controls the communication section 33 to transfer the enciphered random number R1 and random number r2 generated in the step S11 to the reader writer 2 (step S12).

Upon receiving supply of the random number r2 and enciphered random number R1, the control section 24 of the reader writer 2 controls the encipherment section 22 to decipher the enciphered random number R1 using the reduction key received from the controller 1 (step S13). The controller 24 checks whether the random number obtained by deciphering is equal to the random number r1 generated in the step S7, and if the result is NO, then the IC card 3 is judged to be an improper IC card, and the control section 24 informs the judgement to the controller 1 in the step S14. Then, the controller 1 performs error processing (for example, prevent the user from passing the ticket gate).

On the other hand, if the deciphered random number is equal to the random number r1 in the step S13, then the control section 24 control the encipherment section 22 to encipher the random number r2 supplied from the IC card 3 using the reduction key supplied from the controller 1, and an enciphered random number R2 is generated (step S15). Further, the control section 24 transfers the enciphered random number R2 generated as described herein above to the IC card 3 (step S16).

Upon receiving supply of the enciphered random number R2 as described herein above, the control section 36 of the IC card 3 controls the encipherment section 34 to decipher the enciphered random number R2 using the reduction key generated in the step S9 (step S17). Whether the deciphered random number is equal to the random number r2 generated in the step S11 is judged. The judgement result is transferred to the reader writer 2 through the communication section 33 (step S18).

Upon receiving information of authentication result from the IC card 3, the control section 24 of the reader writer 2 informs this result to the controller 1 from the communication section 21 (step S19).

Upon receiving this information through the communication section 12, the controller 14 of the controller 1 performs error processing if the information indicates NG. On the other hand, if the information indicates OK (the IC card is judged to be a proper IC card), the control section 14 of the controller 1 outputs a necessary command such as read out or write to the reader writer 2 (step S20). Upon receiving transfer of the command, the reader writer 2 outputs a read or write command to the IC card 3 (step 21). In this case, read or write of the area 1, area 2, and area 4 of the IC card 3 is instructed as described herein above.

As the result, if write in the area 1, area 2, or area 4 is instructed, then the control section 36 of the IC card 3 performs write processing. If read is instructed, the control section 36 of the IC card 3 performs read processing. The read data is transferred from the IC card 3 to the reader writer 2 (step S22), and transferred from the reader writer 2 to the controller 1 (step S23).

As described herein above, when a plurality of areas receives the access, cipher keys required individually are not authenticated individually. (For example, in the case of the example shown in FIG. 1, authentication processing is performed not individually on the cipher key 1, cipher key 2, and cipher key 4 (in other words, performed not three times).) Instead, one reduction key is generated from a plurality of cipher keys, and authentication processing is performed only once using this one reduction key; as a result, it is possible to perform authentication processing rapidly.

The number of bytes (length) of a reduction key is equal to that of a cipher key in this example; however, it is possible to use different number of bytes. Because a reduction key is used only for authentication, it is not necessary to restore a reduction key to a plurality of original cipher keys.

Figure 8A:
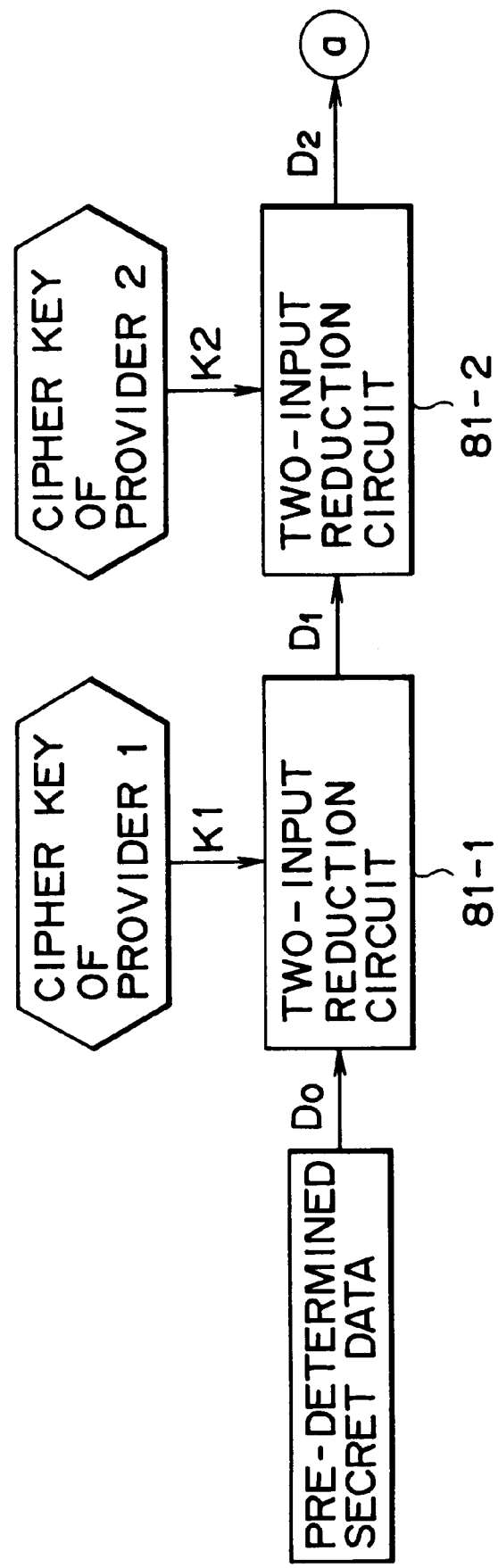

FIG. 8 shows another method for generating a reduction key. In this example, cipher keys K1 to Kn are assigned to respective providers 1 to n, and secret data D0 (not necessary secret because this data is common for the respective providers) which is contained previously are inputted to the first two-input reduction circuit 81-1, and the two-reduction circuit 81-1 enciphers the data D0 based on the cipher key K1 of the provider 1. Next, the two-input reduction circuit 81-2 enciphers the output D1 from the two-input reduction circuit 81-1 based on the cipher key K2 of the provider 2. Then, the same processing is performed successively by the two-input reduction circuit 81-i, the output from the final two-input reduction circuit 81-n is the final reduction key.

When a reduction key is generated as shown in FIG. 3, the provider 2 can not generate a reduction key unless the provider 2 knows the cipher key of the provider 1. Because the respective providers are independent basically, it is not preferable for security that the cipher key of a certain provided is informed to other providers.

On the other hand, the method for generating a reduction key as shown in FIG. 8 is preferable because a provider can generate a reduction key without being informed the cipher key of another provider.

Figure 9:
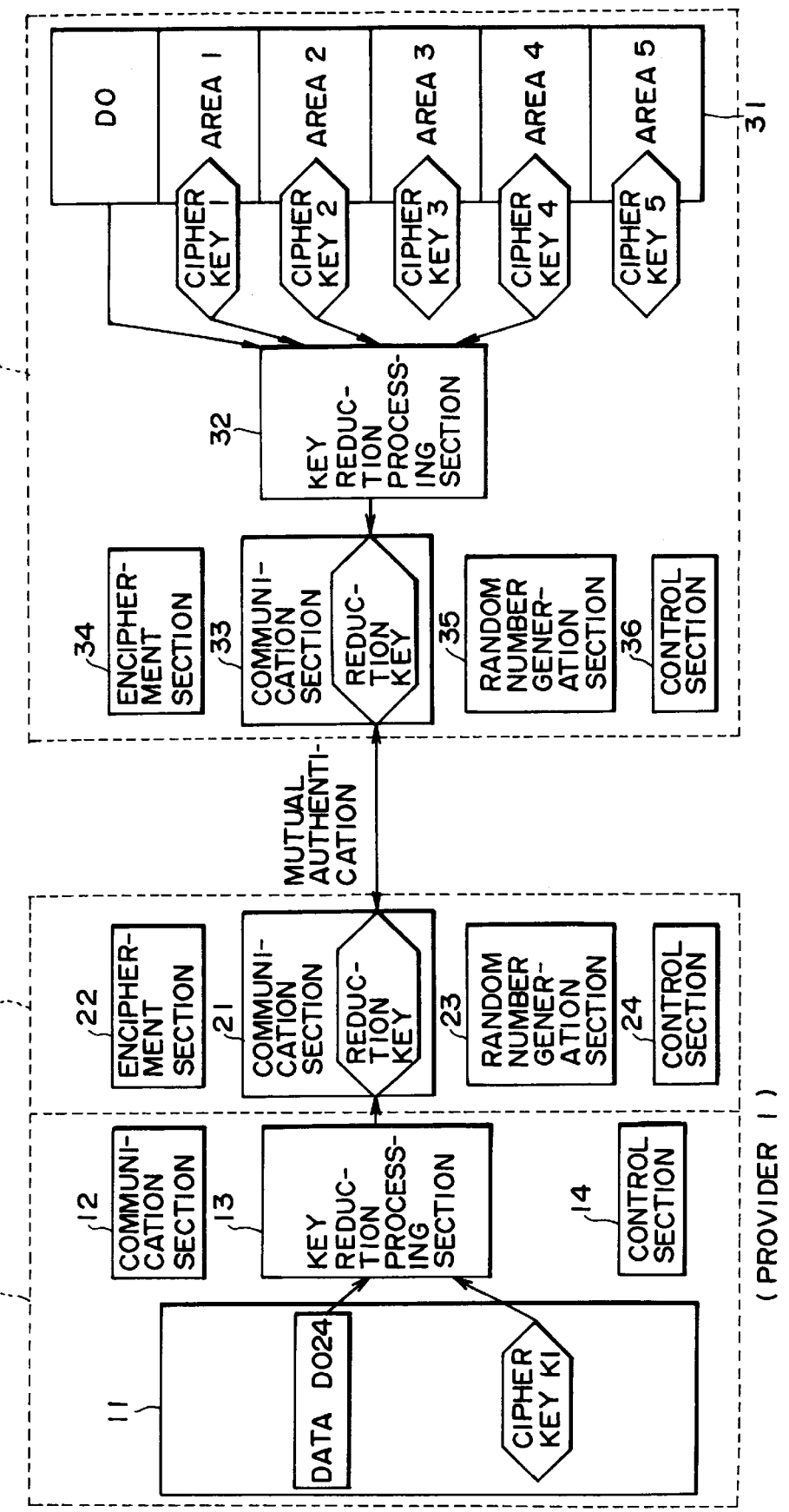
FIG. 9 is a block diagram for illustrating an exemplary structure of an authentication system of a provider in the case that a reduction key is generated in the exemplary structure shown in FIG. 8.
Figure 10:
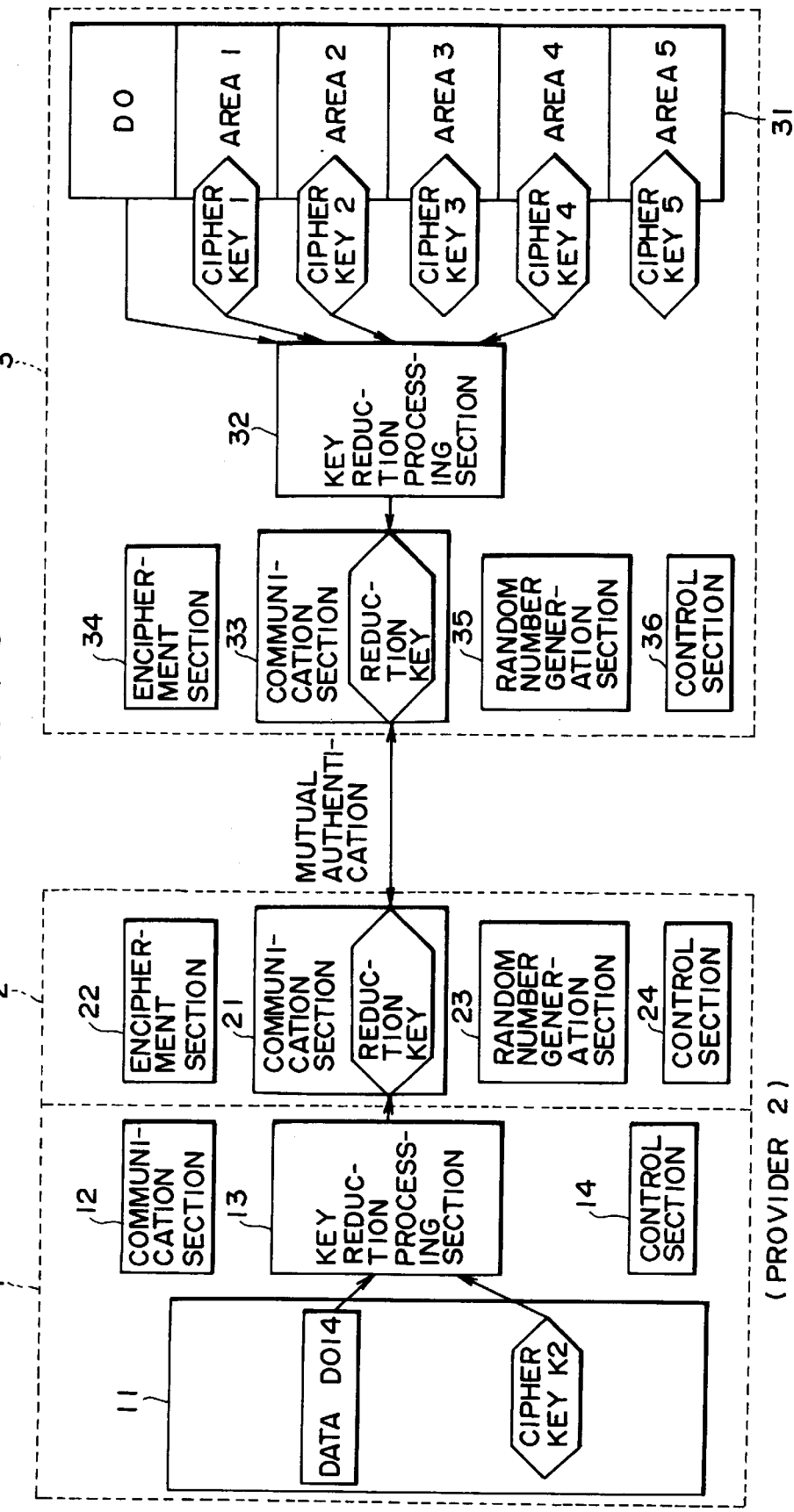
FIG. 10 is a block diagram for illustrating an exemplary structure of an authentication system of the provider 2 in the case that a reduction key is generated in the exemplary structure shown in FIG. 8.
Figure 11:
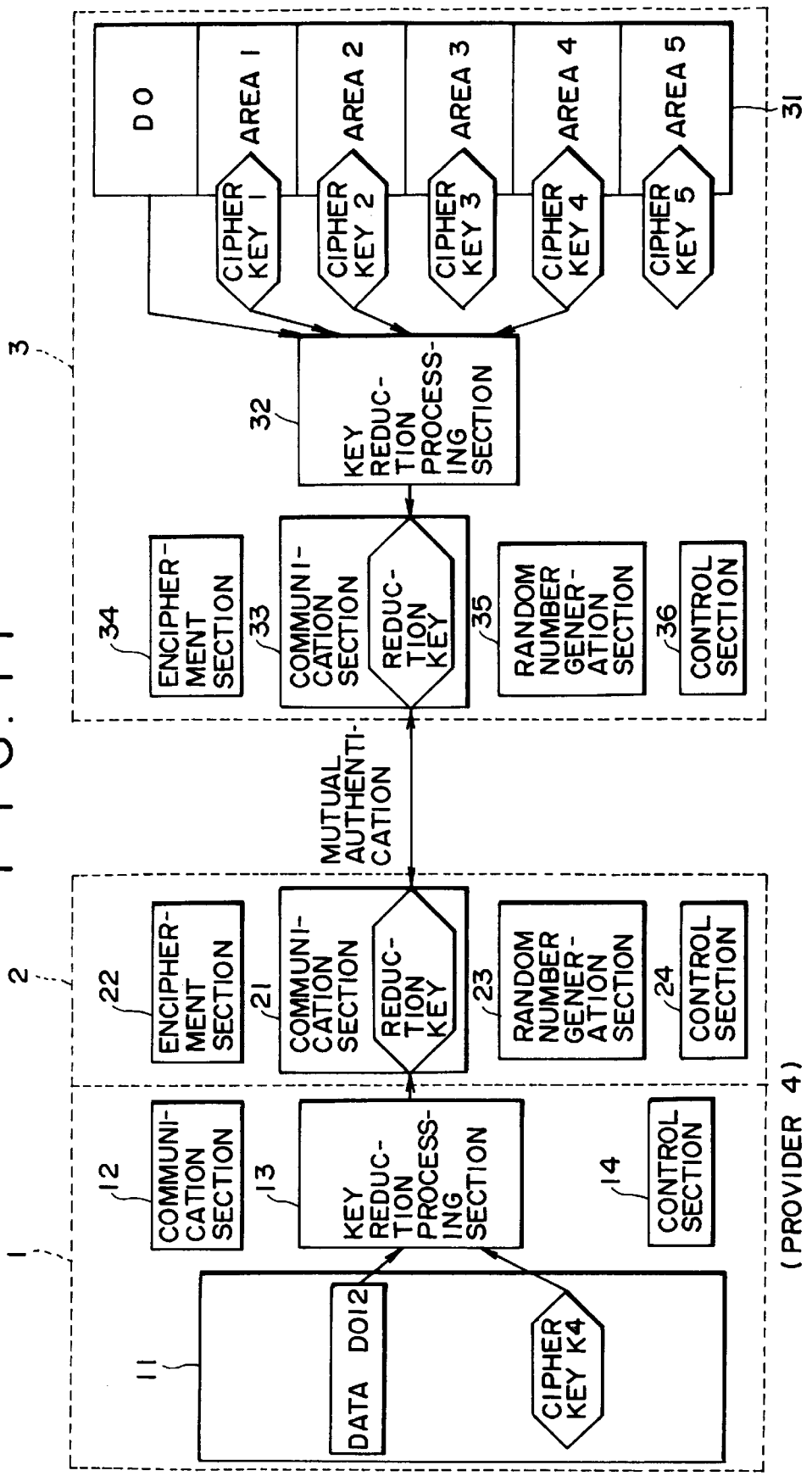
FIG. 11 is a block diagram for illustrating an exemplary structure of an authentication system of the provider 4 in the case that a reduction key is generated in the exemplary structure shown in FIG. 8.

FIGS. 9 to 11 show exemplary structures of a controller 1, reader writer 2, and IC card 3 of the provider 1, provider 2, and provider 4 for the case that a reduction key is generated by the method as shown in FIG. 8.

As shown in these drawings, a prescribed data (common data) D0 is stored previously in the memory 31 in addition to the cipher key K1 to cipher key K5 corresponding to the area 1 to area 5 respectively.

The cipher key K1 of this provider 1 and data D024 are stored in the memory 11 of the provider 1 (FIG. 9), the cipher key K1 of this provider 2 and data D014 are stored in the memory 11 of the provider 2 (FIG. 10), and the cipher key K4 of this provider 4 and data D012 are stored in the memory 11 of the provider 4 (FIG. 11).

These data (individual data) D024, D014, and D012 are generated by methods shown in FIGS. 12 to 14.

In FIG. 12, the provider 1 asks the provider 2 to reduce the predetermined data D0 using the cipher key K2 in the two-input reduction circuit 81-1 to generate data D02. Then, the provider 1 provides the data D02 to the provider 4, the provider 4 then reduces using the cipher key K4 in the two-input reduction circuit 81-2 to generate data D024. The provider 1 receives supply of the data D024 from the provider 4, and stores it in the memory 11.

In this case, it may be possible that the data D0 is provided first to the provider 4, the provider 4 reduces it using the cipher key K4 to generate data D04, and then the data D04 is provided to the provider 2, the provider 2 reduces it using the cipher key K2 to generate data D042, and the data D042 is stored in the memory 11. The provider 1 stores the order of reduction which indicates that the reduction is performed in what order.

As shown in FIG. 13, the provider 2 asks the provider 1 to generate data D01 which is generated by reducing data D0 using the cipher key K1. The provider 2 provides the data D01 to the provider 4, and asks the provider 4 to generate data D014 by reducing the data D01 using the cipher key K4. The data D014 is stored in the memory 11. Like the preceding case, it may be possible that the provider 2 asks reduction processing first to the provider 4, and then provides the data D04 generated using the cipher key K4 to the provider 1, the provider 1 reduces it using the cipher key K1 to generate data D41, the provider 2 obtains the data D041 and stores it in the memory 11. The provider 2 stores also the order of reduction in the memory 11.

Further, as shown in FIG. 14, the provider 4 asks the provider 1 to degenerate the data D0 using the cipher key K1, and the provider 1 generates data D01. The data D01 is provided to the provider 2, the provider 2 reduces it using the cipher key K2 to generate data D012. The provider 4 stores the data D012 in the memory 11. Like the preceding cases, it may be possible that the provider 4 asks reduction processing first to the provider 2 to degenerate the data D0 using the cipher key K2, data D02 is generated, the provider 1 reduces the data D02 using the cipher key K1 to generate data D021. The provider 4 also stores the order of reduction in the memory 11.

The respective providers can perform authentication processing as described below. For example, in the provider 1, the control section 14 controls the reduction processing section 13 as shown in FIG. 9, reads the data D024 and cipher key K1 from the memory 11 to generate a reduction key. The reduction key is transferred to the reader writer 2. Then, the number of providers (in this example, the number is three), provider numbers (in this example, provider 1, provider 2, and provider 4), and order of reduction (in this example, in the order of the provider 2, provider 4, and provider 1) are informed to the reader writer 2. The control section 24 controls the communication section 21, and informs the number of providers, provider numbers, and order of reduction transferred from the control section 14 of the controller 1 to the IC card 3.

In the IC card 3, when the communication section 33 receives these information, the control section 36 controls the reduction processing section 32 corresponding to this information. The reduction processing section 32 reads the data D0 from the memory 31, reduces the data D0 successively using a specified order and the cipher key of a specified provider number to generate a reduction key. In detail, the data D0 is reduced using the cipher key K2, and a reduction key is generated. The reduction key generated as described herein above is the same reduction key as generated by the reduction processing section 13 of the controller 1.

Accordingly, authentication processing is performed by performing processing following the step S10 as in the case described with reference to FIG. 7. The reader writer 2 of the provider 1 can take an access to the area 1, area 2, and area 4 of the memory 31 of the IC card 3.

On the other hand, in the provider 2, as shown in FIG. 10, the control section 14 controls the reduction processing section 13 to read the data D014 from the memory 11, and to regenerate it using the cipher key K2 read from also from the memory 11. The generated reduction key is transferred to the reader writer 2. Then, the number of providers (in this example, the number is three), provider numbers (in this example, provider 1, provider 2, and provider 4), and order of reduction (in this example, in the order of the provider 1, provider 4, and provider 2) are informed to the reader writer 2.

The reader writer 2 transfers this information to the IC card 3. In the IC card 3, a reduction key is generated corresponding to this information.

In detail, the reduction processing section 32 of the IC card 3 reads the data D0 from the memory 31, reduces first using the cipher key K1 to obtain data D01. The data D01 is then reduced using the cipher key K4 and data D014 is generated. The data D014 is reduced using the cipher key K2. The reduction key generated as described herein above is the same reduction key as generated by the controller 1. Therefore the reader writer 2 of the provider 2 can make an access to the area 1, area 2, and area 4 of the memory 31 of the IC card 3.

Further as shown in FIG. 11, in the provider 4, the control section 14 of the controller 1 controls the reduction processing section 13 to degenerate the data D012 stored in the memory 11 using the cipher key K4 and to generate a reduction key, and transfers it to the reader writer 2. Then, the number of providers in (in this example, the number is three), provider numbers (in this example, provider 1, provider 2, and provider 4), and order of reduction (in this example, in the order of the provider 1, provider 2, and provider 4) are informed. This information is transferred to the IC card 3. The IC card 3 performs reduction processing based on this information.

In detail, the reduction processing section 32 reads the data D0 from the memory 31, and generates data D01 using the cipher key K1. The data D01 is then reduced using the cipher key K2, and data D012 is generated. The data D012 is reduced using the cipher key K4, and the final reduction key is generated. The reduction key generated as described herein above is the same reduction key as generated by the controller 1. Therefore the reader writer 2 can make an access to the area 1, area 2, and area 4 of the memory 31 of the IC card 3.

Figure 15A:
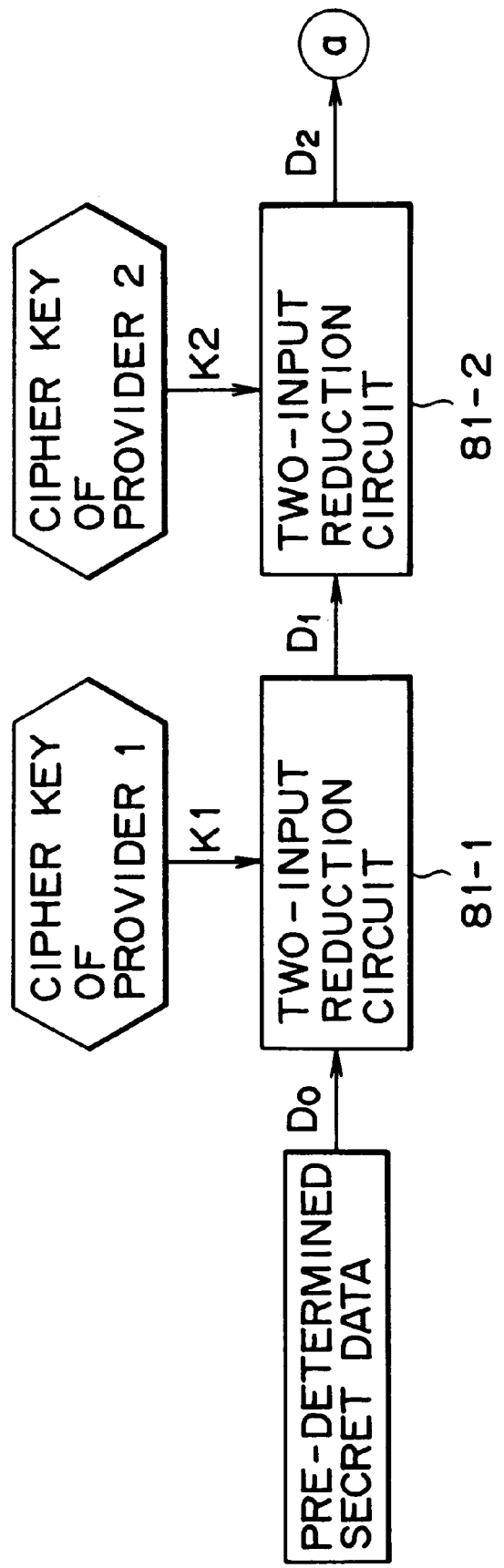

FIG. 15 shows yet another method for reduction key generation. In this method, data Dn-1 inputted to the two-input reduction circuit 81-n which generates the final reduction key and an ID number held previously by the IC card are mathematically operated, the mathematical operation result is subjected to processing using the cipher key Kn, and a reduction key is generated. Other processes are performed as shown in FIG. 8.

FIG. 16 shows an exemplary structure of a controller 1, reader writer 2, and IC card 3 for generating a reduction key according to the method shown in FIG. 15. This figure shows the structure of the provider 4. As shown in this drawing, the memory 11 of the controller 1 stores the data D012, the cipher key K4, and the reduction order. The reader writer 2 is provided with an ID acquisition section 211 for acquiring an ID from the data received by the communication section 21. The IC card 3 stores previously an ID number specific to the IC card 3 in the memory 201 (the memory 201 may be the same memory as the memory 31).

By performing authentication processing in this way using ID number, confusion which may happen when a plurality of users having IC cards containing the same provider combination (for example, combination of the provider 1, provider 2, and provider 4) passed adjacently together a ticket gate of a certain provider can be avoided.

In detail, when a plurality of IC cards 3 passes near the reader writer 2 of a certain provider, the plurality of IC cards 3 respond respectively to the request from the reader writer 2, the reader writer 2 cannot judge, that this response is a response from which IC card, and erroneous processing is performed. However, by using the ID number, such confusion can be avoided.

For example, as shown in FIG. 17, when an IC card 3A and IC card 3B are passing near the reader writer 2, the reader writer 2 requests an ID to the IC card 3 (step S41). Not only a communication section 33 of the IC card 3A but also a communication section 33 of the IC card 3B receive the request. Upon receiving an ID request signal as described herein above, the control section 36 of the IC card 3A controls the random number generation section 35 to generate a certain random number (step S42). The control section 36 of the IC card 3A performs assignment processing of time slot corresponding to the generated random number (step S43). In detail, communication between the reader writer 2 and IC card 3 is performed by time-division multiplex operation, and the IC card 3A assigns a time slot corresponding to the generated random number out of a plurality of time slots as the time slot for communication of this IC card 3A. At the timing of the assigned time slot, the control section 36 of the IC card 3A transmits an ID number (IDA) read out from the memory 201 to the reader writer 2 through the communication section 33 (step S44).

The same processing is performed in the other IC card 3B. In detail, upon receiving an ID request signal from the reader writer 2, the control section 36 of the IC card 3B controls the random number generation section 35 to generate a random number (step S45). The control section 36 of the IC card 3B assigns the time slot corresponding to the generated random number as the time slot of this IC card 3B (step S46). An ID number (IDB) stored in the memory 201 is read out, and transferred to the reader writer 2 at the timing corresponding to the assigned time slot (step S47).

When the communication section 21 receives the ID number transmitted from the IC cards 3A and 3B, the reader writer 2 supplies it to the ID acquirement section 211 for storage. The control section 24 controls the random number generation section 23 to generate a random number r1 (step S48). Further, the control section 24 selects the ID which is acquired, for example, first out of acquired ID's (step S48). The control section receives supply of data D02, cipher key K4, and reduction order, and generates a reduction key corresponding this information.

First, the control section 24 performs a prescribed mathematical operation on the selected ID (for example, IDA of the IC card 3), namely data D012. The mathematical operation may be addition or mathematical operation of exclusive OR. The control section 24 reduces the mathematical operation result using the cipher key K4 to generate a reduction key.

Further, the number of providers, provider numbers, reduction order, and random number r1 are transmitted to the IC card 3 (step S50). The information is received by both the IC card 3A and IC card 3B. Upon receiving the information, the IC card 3B reduces the data D0 using the cipher key K1 according to the specified order and obtains data D0, the data D01 is reduced using the cipher key K2 and data D012 is obtained (step S51). The IDB is read out from the memory 201, and the result obtained by mathematical operation of the IDB and data D012 is reduced using the cipher key K4.

The encipherment section 34 deciphers the enciphered random number r1 using the reduction key generated as described above. However, because the random number r1 was enciphered using the reduction key generated using the IDA, the random number r1 cannot be deciphered using the reduction key generated using the IDB. Therefore the IC card 3B does not respond to transmission from the reader writer 2 hereafter.

On the other hand, in the IC card 3A, the control section 36 generates a reduction key corresponding to the information transmitted from the reader writer 2 (step S52). In detail, the reduction processing section 32 of the IC card 3A reduces data D0 read out from the memory 31 first using the cipher key K1 read out from the area 1 according to the specified reduction order to generate data D01. The data D01 is reduced using the cipher key K2 read out from the area 2, and data D012 is generated. The data D012 and ID number (IDA) read out from the memory 210 are subjected together to the prescribed mathematical operation, and the mathematical operation result is reduced using the cipher key K4 read out from the area 4 to generate a reduction key. The reduction key generated as described above is the same reduction key as generated by the reader writer 2 in the step S49.

Accordingly, by performing the processing of the step S53 to step S59 which are corresponding to the step S10 to step S17 in FIG. 7 hereafter, authentication processing is performed. The processing is the same processing as described with reference to FIG. 7, and the description is omitted.

Figure 18:
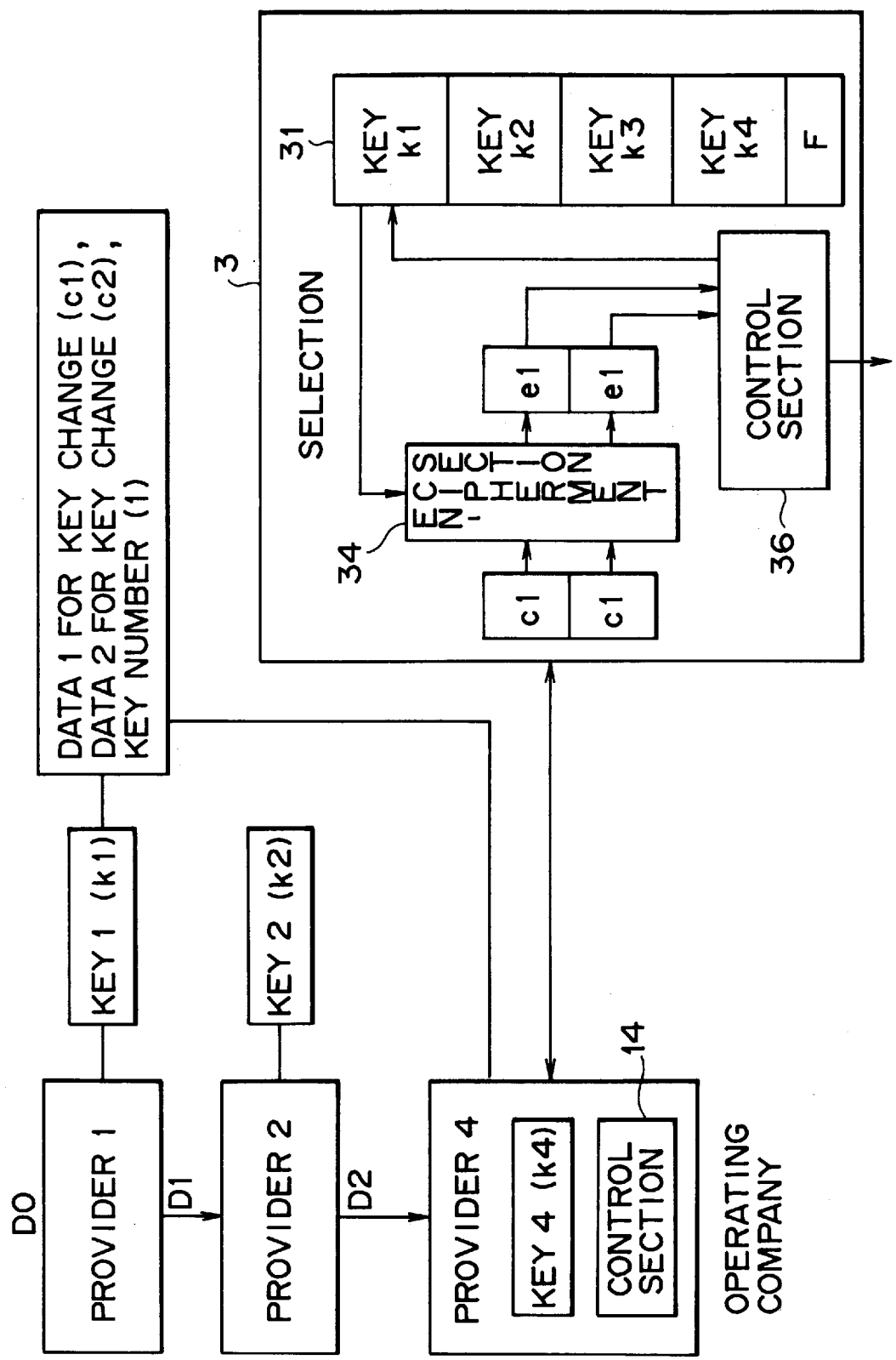
FIG. 18 is a diagram for describing operations for changing a key.

FIG. 18 shows a method for changing a cipher key. For example, when the provider 1 wants to change the cipher key K1, a prescribed random number e1 is generated, and used as a new key K1'. When the cipher key of the provider itself is changed as described above, the provider 1 can change desirably by itself the cipher key K1 stored in the area 1 of the memory 31 of the IC card 3 of the user who uses the reader writer 2 of the provider 1. However, it is required that the cipher key K1 of the IC card 3 of a user who uses the reader writer 2 of other provider 2 or provider 4 must be changed. In this case, the provider 1 can change the cipher key K1 to the new cipher key K1' without notifying the new cipher key K1' to other provider 2 or provider 4.

In this case, the provider 1 generates data and first by mathematical operation of the following equations:

$$C1=E(e1, K1)$$

$$C2=E(e2, K1)$$

Herein, E(A, B) means encipherment of the data A using the key B. A method of encipherment such as DES or FEAL may be used.

e2 is a value which satisfies the following equation:

$$e1+e2=F$$

The value F is a predetermined value, which other provider 2 and provider 4 know the value as a value which is to be used when they change their cipher keys, and is previously stored in the memory 31 of the IC card 3.

When the provider 1 generates the data C1 and C2 as described above, the provider 1 informs this value to other providers together with the key number (in this case, the key number 1) assigned to the cipher key K1 of the provider 1. Each respective provider changes, using these data, the key K1 in the memory 31 of the IC card 3 which uses its reader writer 2 by the way as described below. This change processing is described below with an example for the provider 4.

In detail, the reader writer 2 of the provider 4 transmits the data C1 and C2 to the IC card 3. The encipherment section 34 of the IC card 3 calculates e1 and e2 by performing mathematical operation of the following equations:

$$e1=D(C1, K1)$$

$$e2=D(C2, K1)$$

Herein, D(A, B) means encipherment of the data A using the key B.

Accordingly, the IC card 3 can obtain the data e1 and e2 by deciphering the data C1 and C2 using the key K1 stored in the memory 31.

The control section 36 adds e1 and e2 obtained as described above, and judges whether the addition result is equal to the prescribed value F stored previously in the memory 31. If the result is YES, then the data e1 obtained by deciphering the data C1 is registered as a new key K1' which will be used instead of the key K1.

On the other hand, if the sum of e1 and e2 is not equal to F, change processing is not performed because the change request is regarded improper.

For example, if a malicious provider wants to alter the cipher key K1 of the provider 1, it and mathematically operates the following equation to obtain e1' and e2':

$$e1'=D(C1', K1)$$

$$e2'=D(C2', K1)$$

C1' and C2' are values which the malicious provider sets fittingly.

However, if e1' and e2' generated as described herein above are added, the addition result is generally not equal to the value F. It takes a long time to find a combination of e1' and e2' which results in the value equal to F, and it is substantially very difficult. Therefore the alteration of a cipher key by a third party is prevented.

The provider 2 also performs the same processing to change the cipher key K1 in the memory 31 of the IC card which uses the reader writer 2 of the provider 2.

When the cipher key K1 of the provider 1 is changed as described herein above, the provider 1, provider 2, and provider 4 perform again the same processing as described with reference to FIGS. 12 to 14 to change data D024, D014, and D012 to be stored respectively.

FIG. 19 shows another method of authentication processing. A reader writer 2 shown in FIG. 2 represents the reader writer of the provider 4.

In this example, the control section 24 generates a reduction key Ks using the cipher key K4 and data D012 stored in the memory 11. The control section 24, for example, synthesizes an even number bit and odd number bit of the cipher key K4 to generate the first reduction key K4s1, and synthesizes an odd number bit and even number bit of the cipher key K4 to generate the second reduction key K4s2.

The first reduction key K4s1 is inputted to the encipherment section 22A of the encipherment section 22, and is used to encipher a random number generated by the random number generation section 23. The enciphered random number is transmitted to the IC card 3. When, as in the case described herein above, information required to generate a reduction key is transmitted simultaneously to the IC card 3.

The IC card 3 reads out the data D0 from the memory 31 using this information, and generates a reduction key Ks by applying cipher keys K1, K2, and K4 successively. The reduction key Ks has the same value as the reduction key Ks generated by the reader writer 2.

The control section 36 generates the first reduction key K4s1 and second reduction key K4s2 by performing the same processing as the reader writer 2.

The decipherment section 34B of the encipherment section 34 deciphers the enciphered random number transmitted from the reader writer 2, and transmits the deciphered random number to the encipherment section 34A. The encipherment section 34A enciphers it using the second reduction key K4s2 and transmits it to the reader writer 2.

The decipherment section 22B of the encipherment section 22 in the reader writer 2 deciphers the enciphered random number transmitted from the IC card 3. The deciphered result is transmitted to the control section 24.

The random number deciphered as described above is equal to the same random number as generated by the random number generation section 23 if the IC card is proper. Accordingly, by judging whether the received random number is equal to the generated random number, authentication processing is performed.

What is claimed is:

1. An authentication system for performing authentication processing between a first device and a second device, said first device comprising:

first memory means for storing a plurality of data areas and a first plurality of keys, wherein each of said first plurality of keys indicates access to a corresponding one of said plurality of data areas;

first generation means for generating a first single authentication key from two or more of the first plurality of keys stored in said first memory means, wherein said first single authentication key indicates access to two or more corresponding of said plurality of data areas; and first communication means for communicating said first single authentication key with said second device, and said second device comprising:

second memory means for storing a second plurality of keys equivalent to said first plurality of keys;

second generation means for generating a second single authentication key from two or more of the second plurality of keys stored in said second memory means; and second communication means for communicating said second single authentication key with said first device, wherein one of said first device and said second device further comprises encipherment means for enciphering information using a corresponding one of said first single authentication key and said second single authentication key, and wherein another of said first device and said second device further comprises decipherment means for deciphering said information enciphered by said encipherment means using another corresponding one of said first single authentication key and said second single authentication key.

2. An authentication system according to claim 1, wherein:

said one of said first device and said second device further comprises notification means for notifying, to said another of said first device and said second device, information required to generate said corresponding one of said first single authentication key and said second single authentication key, and said another of said first device and said second device generates said another corresponding one of said first single authentication key and said second single authentication key corresponding to the information notified by said notification means.

3. An authentication system according to claim 1, wherein:

at least one of said first device and said second device further comprises a random number generation means for generating a random number, said encipherment means enciphers said random number generated by said random number generation means, and said decipherment means deciphers said random number enciphered by said encipherment means.

4. An authentication method for performing authentication processing between a first device and a second device, the method in said first device comprising:

a first memory step of storing a plurality of data areas and a first plurality of keys, wherein each of said first plurality of keys indicates access to a corresponding one of said plurality of data areas;

a first generation step of generating a first single authentication key from two or more of the first plurality of keys stored in said first memory step, wherein said first single authentication key indicates access to two or more corresponding of said plurality of data areas; and a first communication step of communicating said first single authentication key with said second device, and the method in said second device comprising:

a second memory step of storing a second plurality of keys equivalent to said first plurality of keys;

second generation step of generating a second single authentication key from two or more of the second plurality of keys stored in said second memory step; and a second communication step of communicating said second single authentication key with said first device, wherein one of said first device and said second device further performs processing in an encipherment step of enciphering information using a corresponding one of said first single authentication key and said second single authentication key, and wherein another of said first device and said second device further performs processing in a decipherment step of deciphering said information enciphered in said encipherment step using another corresponding one of said first single authentication key and said second single authentication key.

5. An authentication device for performing authentication processing with another device, said authentication device comprising:

communication means for communicating a first single authentication key with said another device;

memory means for storing a first plurality of keys;

generation means for generating said first single authentication key from two or more of said first plurality of keys stored in said memory means;

notification means for notifying, to said another device, information required to generate a second single authentication key from two or more of a second plurality of keys stored in said another device and data to be enciphered using said second single authentication key, wherein said second plurality of keys is equivalent to said first plurality of keys; and decipherment means for decoding the enciphered data using said first single authentication key.

6. An authentication device according to claim 5, wherein said notification means notifies a random number as said data to be enciphered.

7. An authentication method for performing authentication processing between an authentication device and another device, comprising:

a communication step of communicating a first single authentication key with said another device;

a memory step of storing a first plurality of keys;

a generation step of generating said first single authentication key from two or more of said first plurality of keys stored in said memory step;

a notification step of notifying, to said another device, information required to generate a second single authentication key from two or more of a second plurality of keys stored in said another device and data to be enciphered using said second single authentication key, wherein said second plurality of keys is equivalent to said first plurality of keys; and a decipherment step of deciphering the enciphered data using said first single authentication key.

8. An authentication device for performing authentication processing with another device, said authentication device comprising:

communication means for communicating a single authentication key with said another device;

memory means for storing a plurality of data areas and a plurality of keys, wherein each of said plurality of keys indicates access to a corresponding one of said plurality of data areas;

generation means for generating said single authentication key from two or more of the plurality of keys stored in said memory means based on information notified by said another device, wherein said single authentication key indicates access to two or more corresponding of said plurality of data areas; and an encipherment means for enciphering the information notified by said another device using said single authentication key.

9. An authentication method for performing authentication processing between an authentication device and another device, comprising:

a communication step of communicating a single authentication key with said another device;

a memory step of storing a plurality of data areas and a plurality of keys, wherein each of said plurality of keys indicates access to a corresponding one of said plurality of data areas;

a generation step of generating said single authentication key from two or more of the plurality of keys stored in said memory step based on information notified by said another device, wherein said single authentication key indicates access to two or more corresponding of said plurality of data areas; and an encipherment step of enciphering the information notified by said another device using said single authentication key.

10. An authentication system for performing authentication processing between a first device and a second device, said first device comprising:

first memory means for storing a first authentication key, a first common data and a first plurality of keys, wherein each of said first plurality of keys corresponds to said first common data combined with a respective one of a second plurality of keys;

first generation means for generating a first single authentication key from said first authentication key and a corresponding one of said first plurality of keys;

first notification means for notifying information required for said second device to generate a second single authentication key corresponding to said first single authentication key; and first communication means for communicating said first single authentication key with said second device, and said second device comprising:

second memory means for storing a plurality of data areas, said second plurality of keys and a second common data equivalent to said first common data, wherein each of said second plurality of keys indicates access to a corresponding one of said plurality of data areas;

second generation means for generating said second single authentication key from the notified information, two or more of said second plurality of keys, and said common data; and second communication means for communicating said second single authentication key with said first device; and wherein one of said first device and said second device further comprises encipherment means for enciphering data using a corresponding one of said first single authentication key and said second single authentication key, and wherein another of said first device and said second device further comprises decipherment means for deciphering the data enciphered by said encipherment means using another corresponding one of said first single authentication key and said second single authentication key.

11. An authentication system according to claim 10, wherein:

said another of said first device and said second device further comprises second encipherment means for enciphering second data using said another corresponding one of said first single authentication key and said second single authentication key;

said one of said first device and said second device further comprises second decipherment means for deciphering the enciphered second data using said corresponding one of said first single authentication key and said second single authentication key;

said first device further comprises random number generation means for generating a random number;

said encipherment means enciphers said random number using said corresponding one of said first single authentication key and said second single authentication key;

said decipherment means deciphers the enciphered random number using said another corresponding one of said first single authentication key and said second single authentication key;

said second encipherment means enciphers the deciphered random number using said another corresponding one of said first single authentication key and said second single authentication key; and said second decipherment means deciphers the enciphered deciphered random number using said corresponding one of said first single authentication key and said second single authentication key.

12. An authentication system according to claim 10, wherein:

the one of said first device and said second device receives from the another device of said first device and said second device a device identification number specific to the another device of said first device and said second device, the another of said first device and said second device stores said device identification number in a corresponding one of said first memory means and said second memory means, and said first generation means and said second generation means use said device identification number for generating a respective one of said first single authentication key and said second single authentication key.

13. An authentication system according to claim 10, wherein:

said first memory means further stores a first verification value;

said second memory means further stores a second verification value having a value equivalent to said first verification value;

said first generation means further generates a replacement key and a verification key, wherein said replacement key corresponds to one of said first plurality of keys that is to be replaced, and wherein said replacement key, said verification key and said first verification value are related;

said first device further comprises said encipherment means, wherein said encipherment means further enciphers first data and second data using said one of said first plurality of keys that is to be replaced, wherein said first data corresponds to said replacement key and said second data corresponds to said verification key;

said first communication means further communicates the enciphered first data and the enciphered second data with said second device;

said second device further comprises said decipherment means, wherein said decipherment means further deciphers the enciphered first data and the enciphered second data using a corresponding one of said second plurality of keys and in accordance therewith generates a deciphered replacement key and a deciphered verification key; and said second device further comprises control means for verifying that said deciphered replacement key, said deciphered verification key, and said second verification value are related, and in accordance therewith replacing said corresponding one of said second plurality of keys with said deciphered replacement key.

14. An authentication method for performing authentication processing between a first device and a second device, the method in said first device comprising:
   a first memory step of storing a first authentication key, a first common data and a first plurality of keys, wherein each of said first plurality of keys corresponds to said first common data combined with a respective one of a second plurality of keys;
   a first generation step generating a first single authentication key from said first authentication key and a corresponding one of said first plurality of keys;
   an first information step of notifying information required for said second device to generate a second single authentication key corresponding to said first single authentication key; and
   a first communication step of communicating said first single authentication key with said second device, and the method in said second device comprising:
   a second memory step of storing a plurality of data areas, said second plurality of keys and a second common data equivalent to said first common data, wherein each of said second plurality of keys indicates access to a corresponding one of said plurality of data areas;
   a second generation step of generating said second single authentication key from the notified information, two or more of said second plurality of keys, and said common data; and
   a second communication step of communicating said second single authentication key with said first device, and
   wherein one of said first device and said second device further performs an encipherment step of enciphering data using a corresponding one of said first single authentication key and said second single authentication key, and
   wherein another of said first device and said second device further performs a decipherment step of deciphering the data enciphered in said encipherment step using another corresponding one of said first single authentication key and said second single authentication key.

15. An authentication device for performing authentication processing with a second device comprising:
   memory means for storing a first authentication key, a first common data and a first plurality of keys, wherein each of said first plurality of keys corresponds to said first common data combined with a respective one of a second plurality of keys;
   generation means for generating a first single authentication key from said first authentication key and a corresponding one of said first plurality of keys;
   notification means for notifying information required for said second device to generate a second single authentication key corresponding to said first single authentication key;
   communication means for communicating said first single authentication key with said second device; and
   encipherment means for enciphering data using said first single authentication key.

16. An authentication device according to claim 15, wherein said generation means uses a device identification number specific to said second device for generating said first single authentication key.

17. An authentication device according to claim 15, wherein:
   said memory means further stores a first verification value;
   said generation means further generates a replacement key and a verification key, wherein said replacement key corresponds to one of said first plurality of keys that is to be replaced, and wherein said replacement key, said verification key and said first verification value are related;
   said encipherment means further enciphers first data and second data using said one of said first plurality of keys that is to be replaced, wherein said first data corresponds to said replacement key and said second data corresponds to said verification key; and
   said communications means further communicates the enciphered first data and the enciphered second data with said second device.

18. An authentication method for performing authentication processing with a second device, the method comprising:
   a memory step of storing a first authentication key, a first common data and a first plurality of keys, wherein each of said first plurality of keys corresponds to said first common data combined with a respective one of a second plurality of keys;
   a generation step of generating a first single authentication key from said first authentication key and a corresponding one of said first plurality of keys;
   a notification step of notifying information required for said second device to generate a second single authentication key corresponding to said first single authentication key;
   a communication step of communicating said first single authentication key with said second device; and
   an encipherment step of enciphering data using said first single authentication key.

19. An authentication device for performing authentication processing with a second device, said authentication device comprising:
   memory means for storing a plurality of data areas, a plurality of keys and common data, wherein each of said plurality of keys indicates access to a corresponding one of said plurality of data areas;
   generation means for generating a first single authentication key from two or more of the plurality of keys and said common data, in accordance with information received from said second device, wherein said first single authentication key indicates access to two or more corresponding of said plurality of data areas;
   communication means for communicating said first single authentication key with said second device; and
   decipherment means for deciphering data using said first single authentication key, wherein said data was enciphered by said second device.

20. An authentication device according to claim 19, wherein said generation means uses a device identification number specific to said authentication device in addition to the information received from said second device.

21. An authentication device according to claim 19, wherein:
   said memory means further stores a verification value;
   said decipherment means further deciphers an enciphered first data and an enciphered second data received from said second device using a corresponding one of said plurality of keys and said common data, and in accordance therewith generates a deciphered replacement key and a deciphered verification key; and said authentication device further comprises control means for verifying that said deciphered replacement key, said deciphered verification key, and said verification value are related, and in accordance therewith replacing said corresponding one of said plurality of keys with said deciphered replacement key.

22. An authentication method for performing authentication processing with a second device, the method comprising:

a memory step of storing a plurality of data areas, a plurality of keys and common data, wherein each of said plurality of keys indicates access to a corresponding one of said plurality of data areas;

a generation step of generating a first single authentication key from two or more of the plurality of keys keys and said common data, in accordance with information received from said second device, wherein said first single authentication key indicates access to two or more corresponding of said plurality of data areas;

a communication step of communicating said first single authentication key with said second device; and a decipherment step of deciphering data using said first single authentication key, wherein said data was enciphered by said second device.

* * * * *